US010208651B2

(12) United States Patent
Tozzi et al.

(10) Patent No.: US 10,208,651 B2
(45) Date of Patent: Feb. 19, 2019

(54) LEAN-BURN PRE-COMBUSTION CHAMBER

(71) Applicant: Prometheus Applied Technologies, LLC, Fort Collins, CO (US)

(72) Inventors: Luigi P. Tozzi, Fort Collins, CO (US); Maria-Emmanuella Sotiropoulou, Fort Collins, CO (US); Greg Beshouri, Berkeley, CA (US); David Thomas Lepley, Girard, OH (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 0 days.

(21) Appl. No.: 15/422,751

(22) Filed: Feb. 2, 2017

(65) Prior Publication Data

US 2017/0226922 A1   Aug. 10, 2017

Related U.S. Application Data

(60) Provisional application No. 62/292,301, filed on Feb. 6, 2016.

(51) Int. Cl.
*F02B 19/00* (2006.01)
*F02B 19/08* (2006.01)
(Continued)

(52) U.S. Cl.
CPC .............. *F02B 19/08* (2013.01); *F02B 19/12* (2013.01); *F02B 19/18* (2013.01); *F02B 2043/103* (2013.01)

(58) Field of Classification Search
CPC .......... F02B 19/08; F02B 19/12; F02B 19/18; F02B 2043/103
See application file for complete search history.

(56) References Cited

U.S. PATENT DOCUMENTS 1,365,143 A   1/1921   Anderson
1,422,794 A   7/1922   Smith
(Continued)

FOREIGN PATENT DOCUMENTS

| DE | 3230793 A1 | 2/1984 |
| DE | 10144976 A1 | 4/2003 |
| DE | 102010004851 A1 | 6/2011 |
| DE | 102010022564 A1 | 12/2011 |
| GB | 2047802 A | 12/1980 |
| JP | S5422605 U | 2/1979 |

(Continued)

OTHER PUBLICATIONS

Luigi Tozzi, Emmanuella Sotiropoulou, Jessica Harral, Daniel Miller-Lionberg, Kelly Benson, Passive Prechamber Spark Plugs: Then and Now, 7th Dessauer Gasmotoren Conference, 2011/pp. 157-169. 7 Pages.

(Continued)

*Primary Examiner* — Hieu T Vo
*Assistant Examiner* — Sherman Manley
(74) *Attorney, Agent, or Firm* — Barcelo, Harrison & Walker LLP

(57) ABSTRACT

In certain embodiments, a unique method and pre-combustion chamber (PCC) structure may ensure very efficient flame propagation of lean fuel-air mixture in natural gas engines by reducing the amount of fuel admitted to the PCC. A PCC may include an enclosed volume of 1-3% of the main combustion chamber volume, with a spark plug and a fuel passage located opposite one or more PCC discharge nozzles to create a relatively richer fuel-air mixture with relatively lower turbulence in the spark plug region and a relatively leaner fuel-air mixture with relatively high turbulence in the nozzle region, which can be reliably and efficiently ignited, resulting in a high velocity flame jet/torch emerging from the prechamber into the main chamber. The (Continued)

US 10,208,651 B2

Page 2

PCC may be threaded with a 22 mm×1.5 or ⅞"-18 thread size, to allow the PCC to be screwed into a cylinder head in place of a spark plug.

13 Claims, 32 Drawing Sheets

(51) Int. Cl.
*F02B 19/12* (2006.01)
*F02B 19/18* (2006.01)
*F02B 43/10* (2006.01)

(56) References Cited

U.S. PATENT DOCUMENTS

| | | | |
|---|---|---|---|
| 1,633,384 A | 6/1927 | Lucke | |
| 1,660,424 A | 2/1928 | Modersohn | |
| 1,877,737 A | 9/1932 | Goldberg | |
| 1,930,003 A | 10/1933 | Erny | |
| 1,945,870 A | 2/1934 | Stephenson | |
| 2,127,512 A | 8/1938 | Harper | |
| 2,456,080 A | 12/1948 | Pe | |
| 2,991,768 A | 7/1961 | Witzky | |
| 3,014,465 A * | 12/1961 | Dressler | F02B 19/08 123/271 |
| 3,955,362 A | 5/1976 | Jones et al. | |
| 3,983,847 A | 10/1976 | Wyczalek et al. | |
| 4,124,000 A | 11/1978 | Genslak | |
| 4,128,081 A | 12/1978 | Noguchi | |
| 4,174,679 A | 11/1979 | Noguchi | |
| 4,188,932 A | 2/1980 | Konishi et al. | |
| 4,218,993 A | 8/1980 | Blackburn | |
| 4,292,841 A * | 10/1981 | Wesley | F02P 7/077 73/114.18 |
| 4,377,140 A * | 3/1983 | Latsch | F02D 35/022 123/406.26 |
| 4,416,228 A | 11/1983 | Benedikt et al. | |
| 4,442,807 A | 4/1984 | Latsch et al. | |
| 4,463,729 A * | 8/1984 | Bullis | F01B 9/047 123/435 |
| 4,471,732 A | 9/1984 | Tozzi | |
| 4,646,695 A | 3/1987 | Blackburn | |
| 4,696,269 A | 9/1987 | Blackburn | |
| 4,730,582 A | 3/1988 | Lindsay | |
| 4,875,939 A | 10/1989 | Miyakawa et al. | |
| 4,892,070 A * | 1/1990 | Kuhnert | F02B 19/1066 123/266 |
| 4,930,473 A | 6/1990 | Dietrich | |
| 5,060,609 A | 10/1991 | Merritt | |
| 5,203,298 A * | 4/1993 | Manolis | F02B 19/1004 123/266 |
| 5,211,147 A | 5/1993 | Ward | |
| 5,222,993 A * | 6/1993 | Crane | F02B 19/12 123/256 |
| 5,554,908 A | 9/1996 | Kuhnert et al. | |
| 5,555,862 A | 9/1996 | Tozzi | |
| 5,619,959 A * | 4/1997 | Tozzi | H01T 13/50 123/143 B |
| 5,791,374 A * | 8/1998 | Black | F02B 19/1033 123/267 |
| 5,947,076 A * | 9/1999 | Srinivasan | F02B 19/12 123/256 |
| 6,131,555 A | 10/2000 | Tozzi et al. | |
| 6,595,182 B2 * | 7/2003 | Oprea | F02B 19/12 123/295 |
| 7,100,567 B1 | 9/2006 | Bailey et al. | |
| 7,216,623 B2 | 5/2007 | Teraji et al. | |
| 7,243,634 B2 | 7/2007 | Tourteaux et al. | |
| 7,438,043 B2 * | 10/2008 | Shiraishi | F02B 19/12 123/260 |
| 7,659,655 B2 | 2/2010 | Tozzi et al. | |
| 8,584,648 B2 | 11/2013 | Chiera et al. | |
| 8,662,053 B2 * | 3/2014 | LaPointe | F02B 19/12 123/266 |
| 8,826,883 B2 * | 9/2014 | Ishida | F01P 3/16 123/275 |
| 8,839,762 B1 | 9/2014 | Chiera et al. | |
| 8,857,405 B2 | 10/2014 | Attard | |
| 8,925,518 B1 * | 1/2015 | Riley | F02B 19/10 123/261 |
| 9,004,042 B2 | 4/2015 | Tozzi et al. | |
| 9,172,217 B2 | 10/2015 | Hampson et al. | |
| 9,476,347 B2 | 10/2016 | Chiera et al. | |
| 9,653,886 B2 * | 5/2017 | Chiera | H01T 13/06 |
| 9,890,689 B2 * | 2/2018 | Hampson | F02M 21/0275 |
| 2002/0017271 A1 | 2/2002 | Suckewer et al. | |
| 2002/0134345 A1 | 9/2002 | Adams | |
| 2003/0196634 A1 * | 10/2003 | Lausch | F02B 1/12 123/260 |
| 2004/0100179 A1 | 5/2004 | Boley et al. | |
| 2005/0211217 A1 | 9/2005 | Boley et al. | |
| 2006/0219210 A1 | 10/2006 | Bailey et al. | |
| 2007/0069617 A1 | 3/2007 | Tozzi et al. | |
| 2009/0107439 A1 | 4/2009 | Schultz | |
| 2009/0309475 A1 | 12/2009 | Tozzi | |
| 2010/0132660 A1 * | 6/2010 | Nerheim | F02B 19/1014 123/260 |
| 2011/0108012 A1 | 5/2011 | Bryant | |
| 2011/0148274 A1 | 6/2011 | Ernst et al. | |
| 2011/0175514 A1 | 7/2011 | Kameda | |
| 2012/0103302 A1 * | 5/2012 | Attard | F02B 19/12 123/260 |
| 2012/0125287 A1 * | 5/2012 | Chiera | F02B 19/12 123/254 |
| 2012/0310510 A1 * | 12/2012 | Imamura | F02D 41/0027 701/104 |
| 2013/0000598 A1 * | 1/2013 | Tokuoka | F02B 19/1023 123/254 |
| 2013/0206122 A1 * | 8/2013 | Chiera | H01T 13/54 123/594 |
| 2013/0220269 A1 * | 8/2013 | Woo | F02B 19/06 123/260 |
| 2014/0060479 A1 | 3/2014 | Tozzi et al. | |
| 2014/0083391 A1 * | 3/2014 | Gruber | F02B 19/1095 123/260 |
| 2014/0102404 A1 | 4/2014 | Sotiropoulou et al. | |
| 2014/0209057 A1 * | 7/2014 | Pouring | F02B 19/12 123/257 |
| 2015/0068489 A1 * | 3/2015 | Bunce | F02B 19/1057 123/262 |
| 2015/0128898 A1 * | 5/2015 | Osaka | F02B 19/08 123/263 |
| 2015/0260131 A1 * | 9/2015 | Riley | F02M 31/20 123/253 |
| 2015/0267631 A1 * | 9/2015 | Miyamoto | F02D 41/3094 123/445 |
| 2016/0010538 A1 * | 1/2016 | Suzuki | F02B 19/1085 123/292 |
| 2016/0047323 A1 * | 2/2016 | Suzuki | F02P 5/1502 60/285 |
| 2016/0053668 A1 * | 2/2016 | Loetz | F02B 19/1085 123/260 |
| 2016/0053670 A1 | 2/2016 | Tozzi | |

FOREIGN PATENT DOCUMENTS

| | | |
|---|---|---|
| JP | S5669416 A | 6/1981 |
| JP | S57173524 A | 10/1982 |
| JP | 2001227344 A | 8/2001 |
| JP | 2006144648 A | 6/2006 |
| JP | 2007113536 A | 5/2007 |
| JP | 2007198244 A | 8/2007 |
| JP | 2009270539 A | 11/2009 |
| JP | 2009270540 A | 11/2009 |
| WO | 0075505 A1 | 12/2000 |
| WO | 0133056 A1 | 5/2001 |
| WO | 2003044349 A1 | 5/2003 |
| WO | 2004083612 A2 | 9/2004 |
| WO | 2006011950 A2 | 2/2006 |

(56) References Cited

FOREIGN PATENT DOCUMENTS

WO     2012091739 A2    7/2012
WO     2015/060236 A1   4/2015

OTHER PUBLICATIONS

Luigi Tozzi and Eli K. Dabora, Plasma Jet Ignition in a Lean-Burn CFR Engine, Nineteenth Symposium (International) on Combustion/ The Combustion Institute, 1982/pp. 1467-1474. 8 Pages.

McCoole, Maria-Emmanuella. "Solutions for Improving Spark Plug Life in High Efficiency, High Power Density, Natural Gas Engines". ASME, 2006.

Sotiropoulou, Emmanuella. "Advanced Combustion System Solutions for Increasing Thermal Efficiency in Natural Gas Engines While Meeting Future Demand for Low Nox Emissions". ASME, 2006.

Office Action of Canadian Patent Application No. 2,957,094 dated May 17, 2018. 9 Pages.

\* cited by examiner

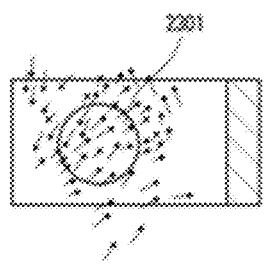
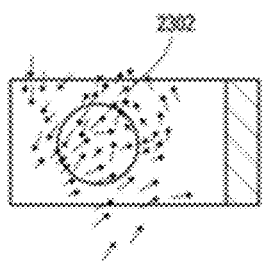
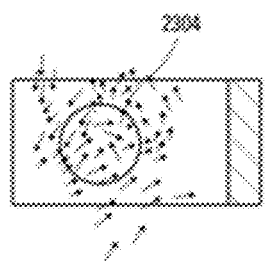
Fig. 23A　　　Fig. 23B　　　Fig. 23C
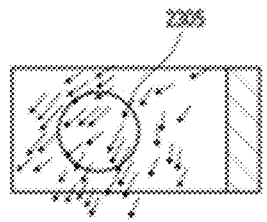
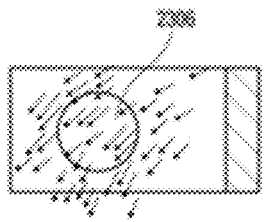
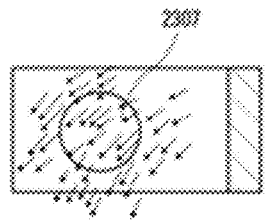
Fig. 23D　　　Fig. 23E　　　Fig. 23F
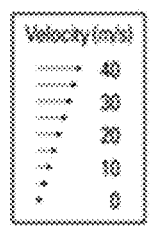

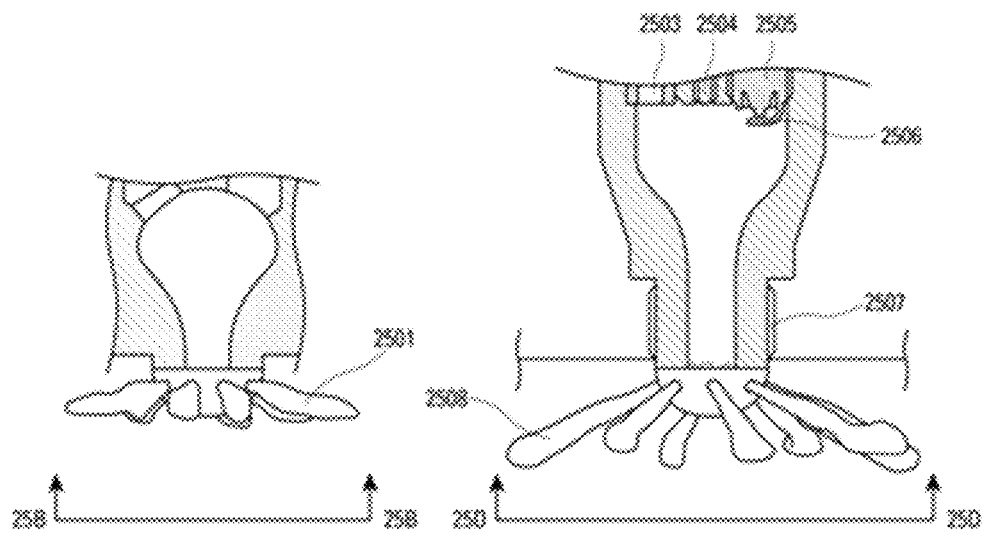
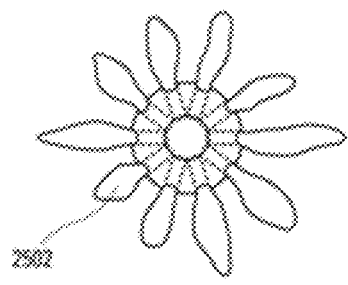
Fig. 25A
Fig. 25C
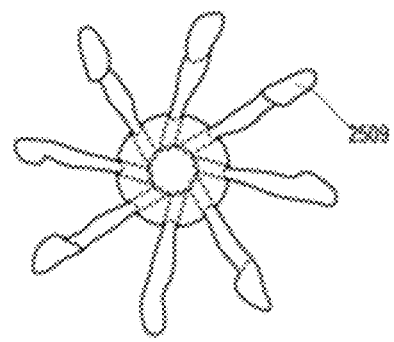
Fig. 25B
Fig. 25D

LEAN-BURN PRE-COMBUSTION CHAMBER

I. CROSS-REFERENCE TO RELATED APPLICATIONS

This application claims priority to U.S. Patent Application No. 62/292,301, entitled "Lean-Burn Pre-Combustion Chamber," and filed on Feb. 6, 2016. The entirety of the foregoing patent application is incorporated by reference herein.

II. FIELD OF THE INVENTION

The disclosure generally relates to systems and methods for a lean-burn pre-combustion chamber, and more particularly to a lean-burn pre-combustion chamber that utilizes a unique flow dynamic method and resulting prechamber structure to ensure very efficient flame propagation of lean fuel-air mixture (lambda=☐) within the PCC of natural gas engines.

III. BACKGROUND OF THE INVENTION

Pre-combustion chamber (PCC) ignition is a common method for extending the lean limit and reducing combustion variability in large bore (360-560 mm) natural gas engines. However, all the existing PCC designs operate under "rich" burn conditions, resulting in less than optimum combustion performance in terms of engine efficiency and NOx emission trade-off.

IV. BRIEF DESCRIPTION OF THE DRAWINGS

Figure 3A:
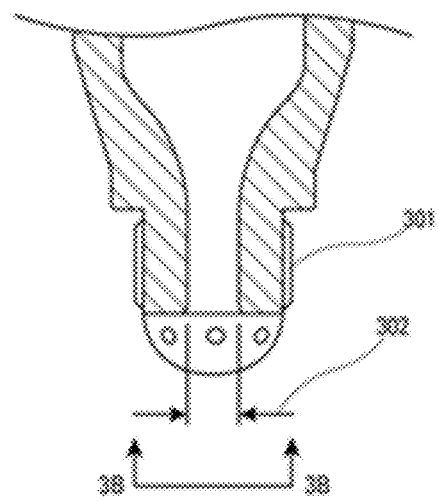
Figure 3B:
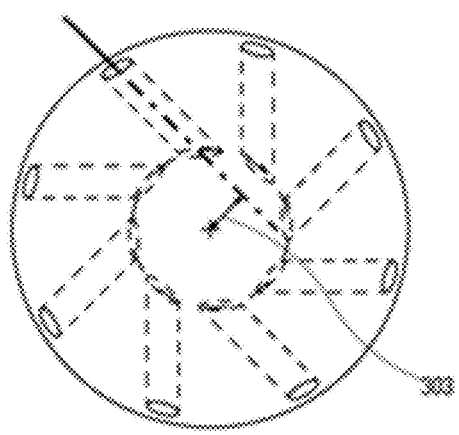

FIGS. 3A-B depict a screw-in pre-combustion chamber in accordance with certain embodiments.

Figure 3C:
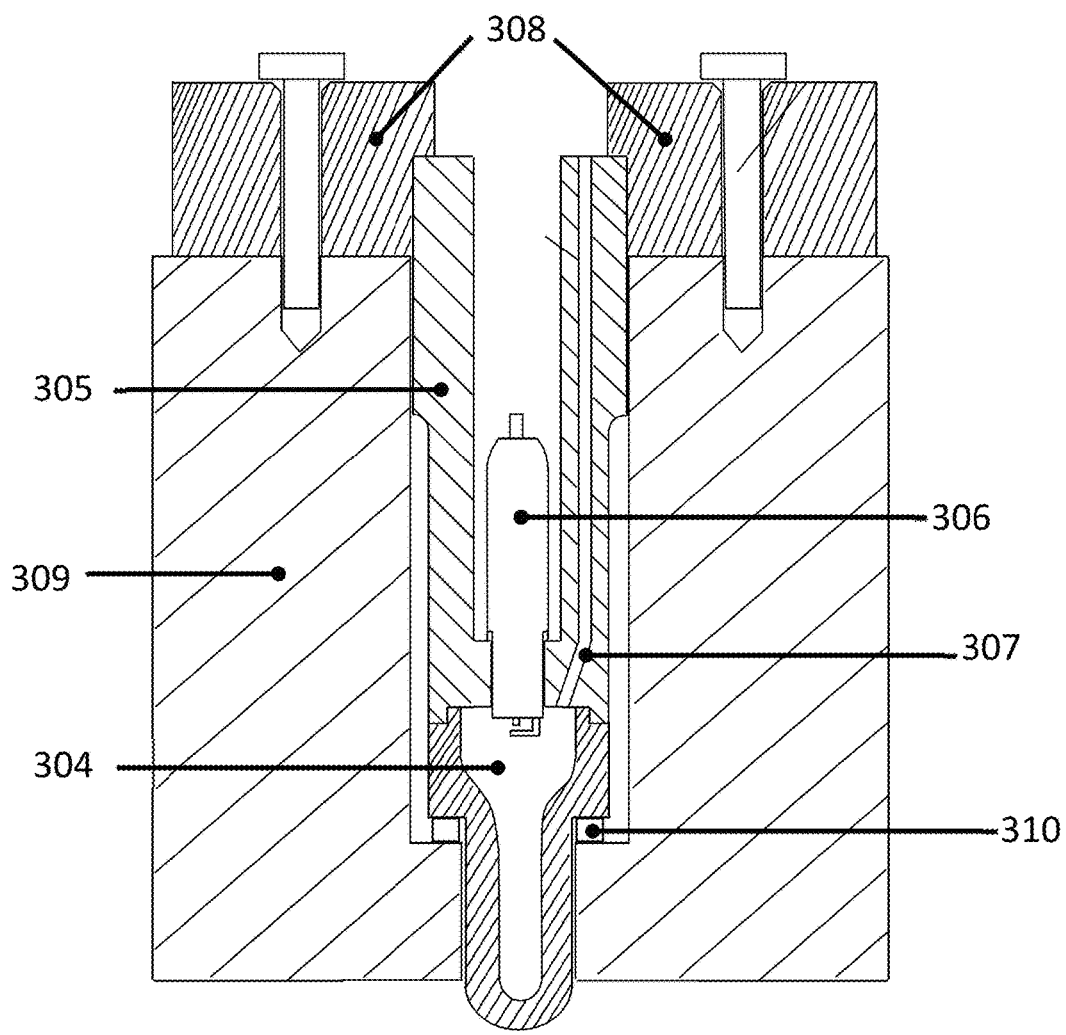

FIG. 3C depicts a clamped pre-combustion chamber in accordance with certain embodiments.

Figure 4A:
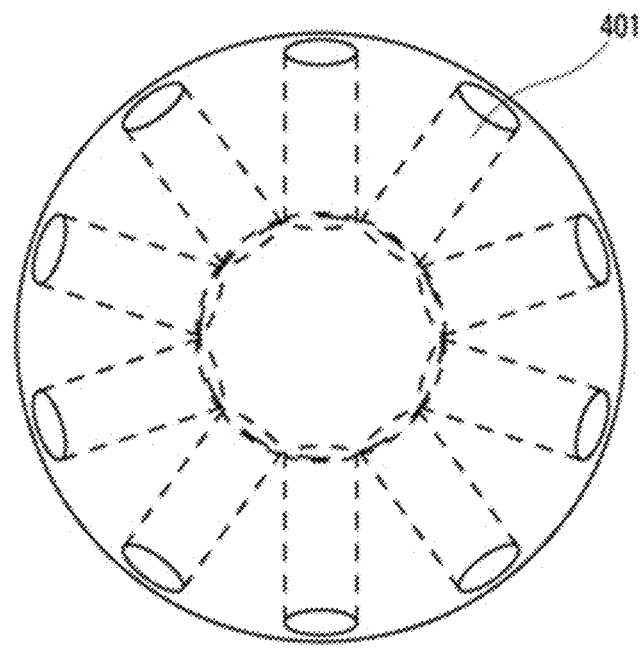
Figure 4B:
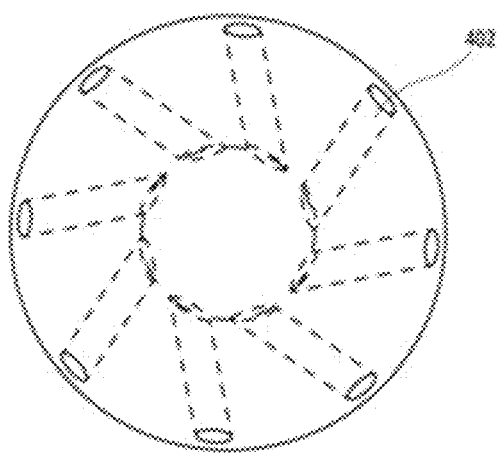

FIGS. 4A-B depict exemplary pre-combustion chambers with various nozzle angles in accordance with certain embodiments.

Figure 5:
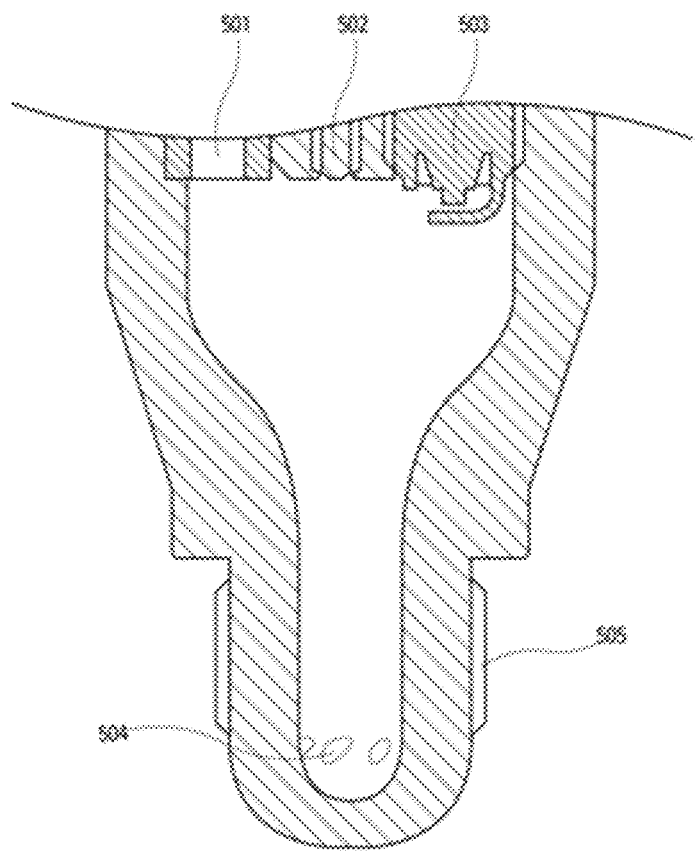

FIG. 5 depicts a lean-burn pre-combustion chamber in accordance with certain embodiments.

Figure 6A:
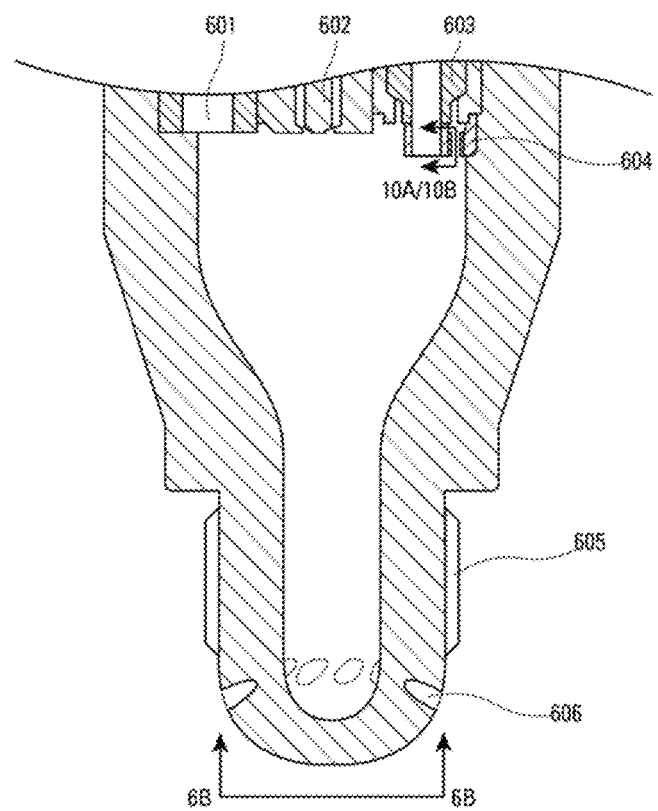
Figure 6B:
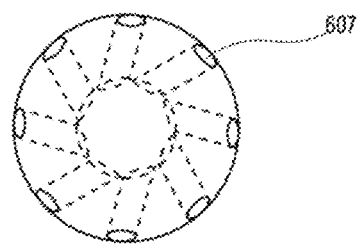

FIGS. 6A-B depict a lean-burn pre-combustion chamber in accordance with certain embodiments.

Figure 7A:
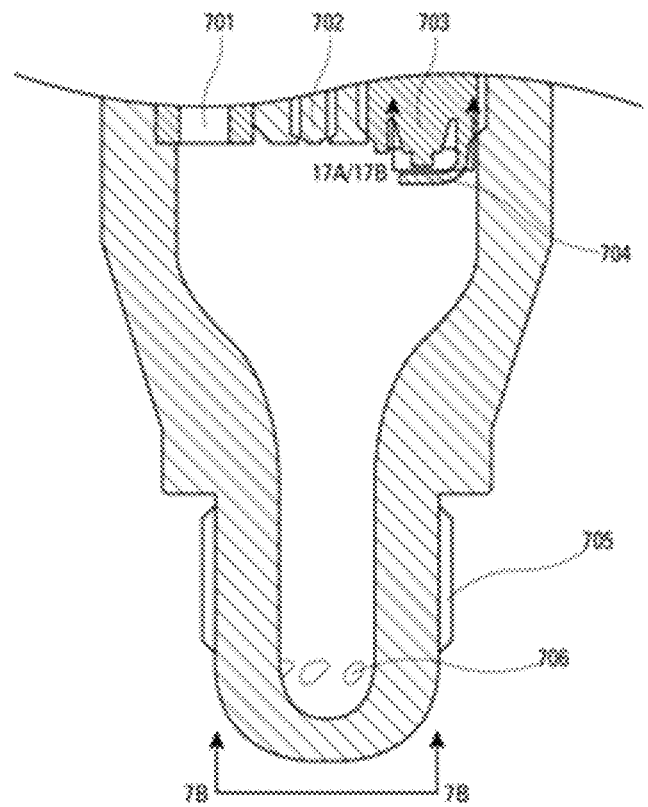
Figure 7B:
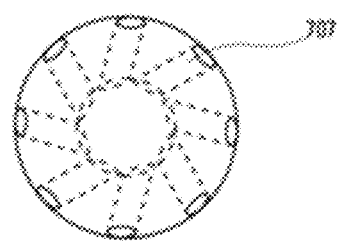

FIGS. 7A-B depict a lean-burn pre-combustion chamber with a J-gap type spark plug in accordance with certain embodiments.

Figure 8A:
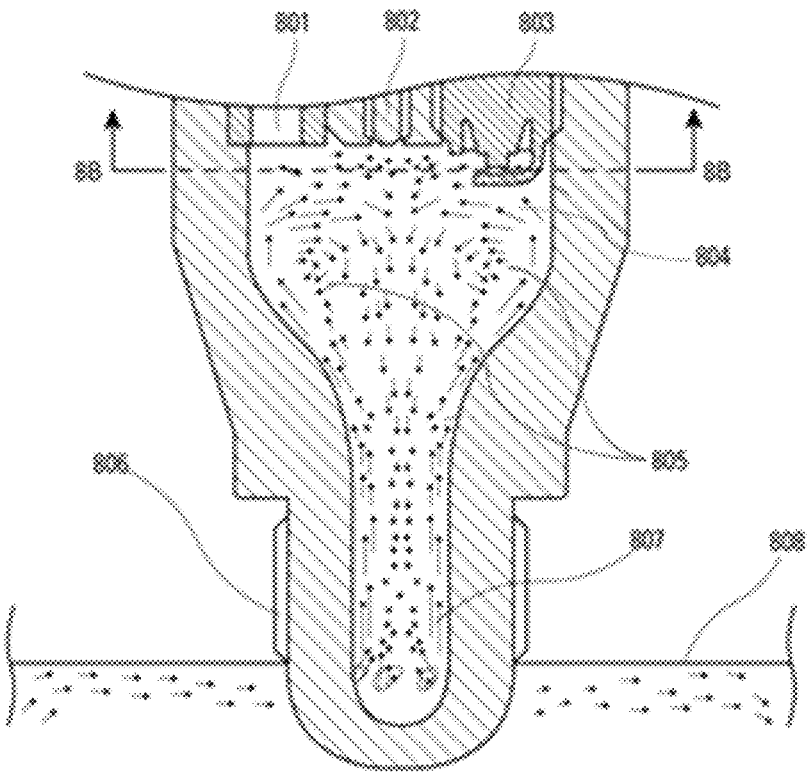
Figure 8B:
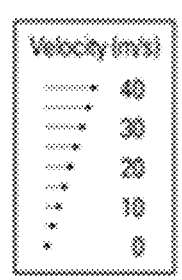
Figure 8B:
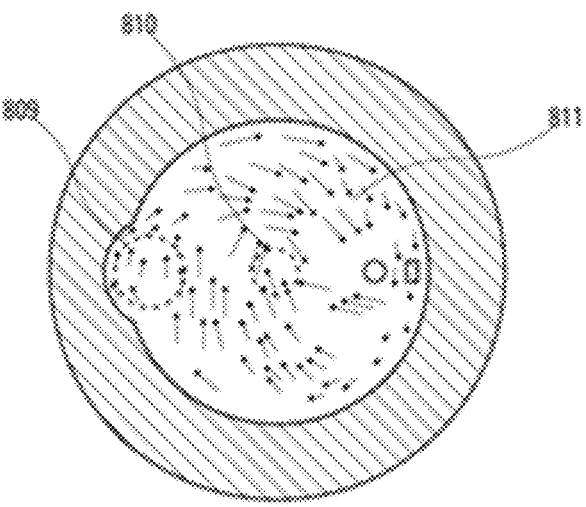

FIGS. 8A-B depict a flow pattern of a fuel-air mixture in a lean-burn pre-combustion chamber in accordance with certain embodiments.

Figure 9A:
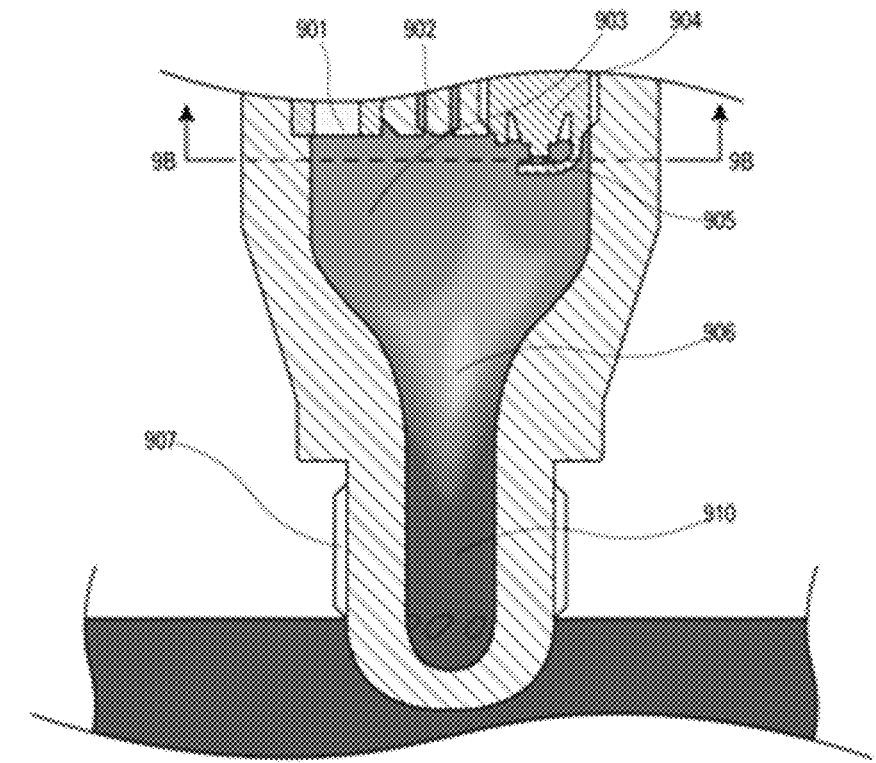
Figure 9A:
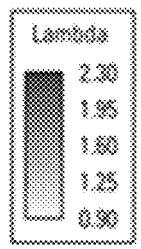
Figure 9B:
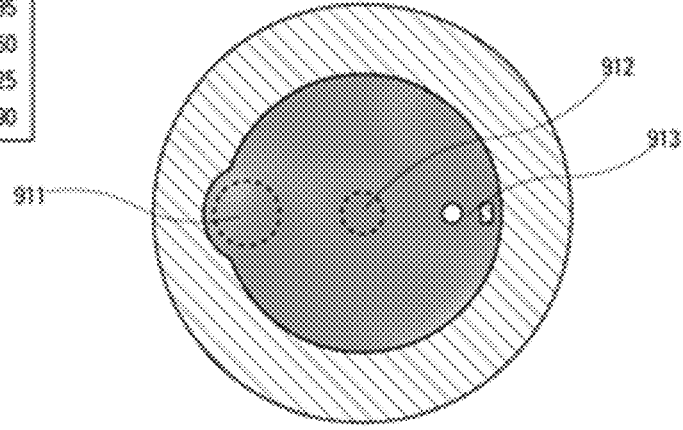

FIGS. 9A-B depict a fuel-air mixture distribution in a lean-burn pre-combustion chamber in accordance with certain embodiments.

Figure 10A:
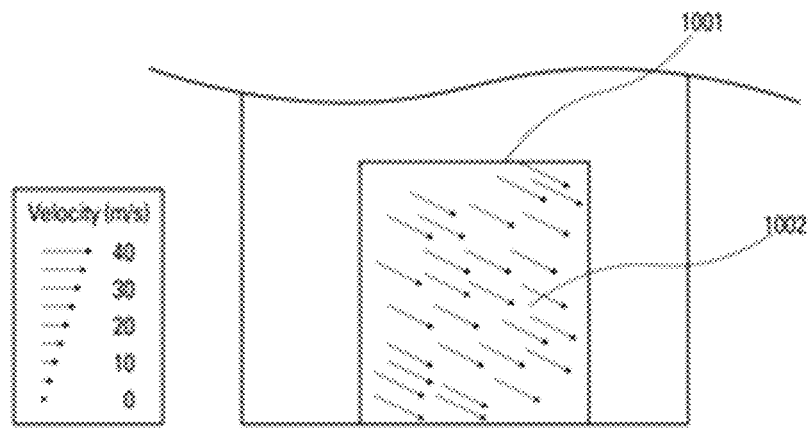
Figure 10B:
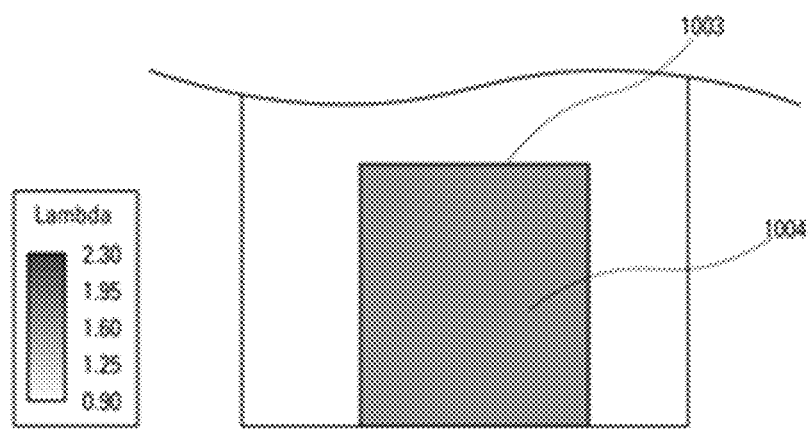

FIGS. 10A-B depict a flow pattern of a fuel-air mixture and a fuel-air mixture distribution in a lean-burn pre-combustion chamber in accordance with certain embodiments.

Figure 11A:
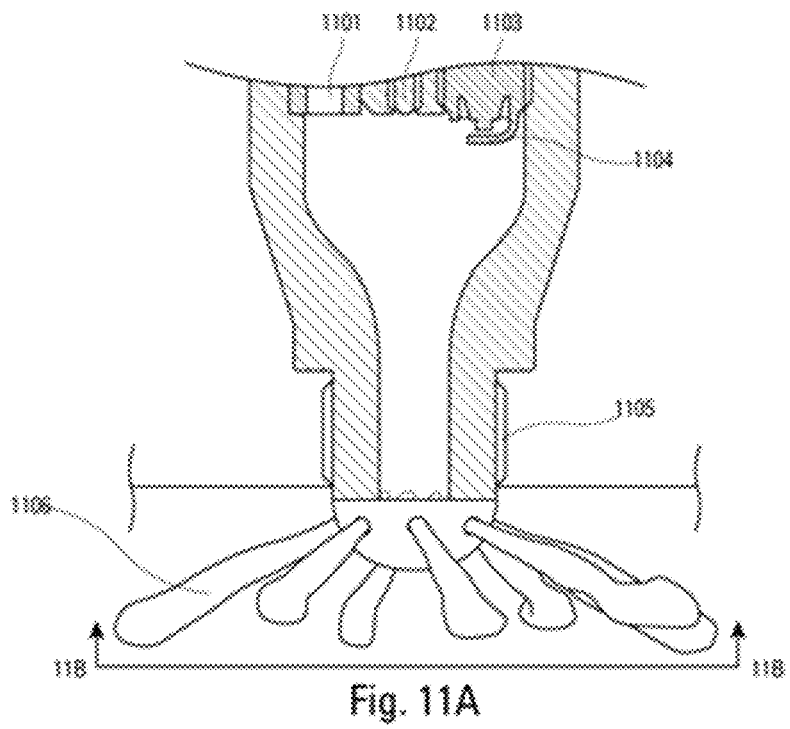
Figure 11B:
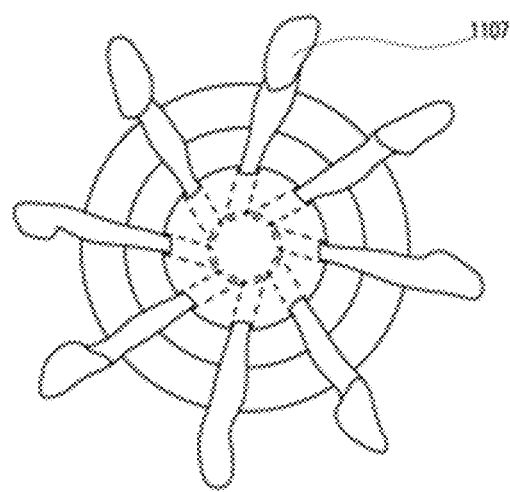

FIGS. 11A-B depict flame torches in a lean-burn pre-combustion chamber in accordance with certain embodiments.

Figure 12A:
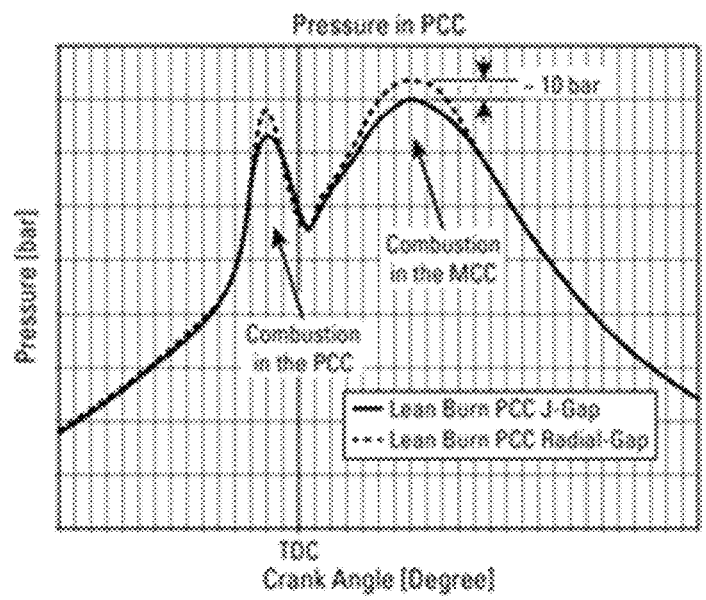
Figure 12B:
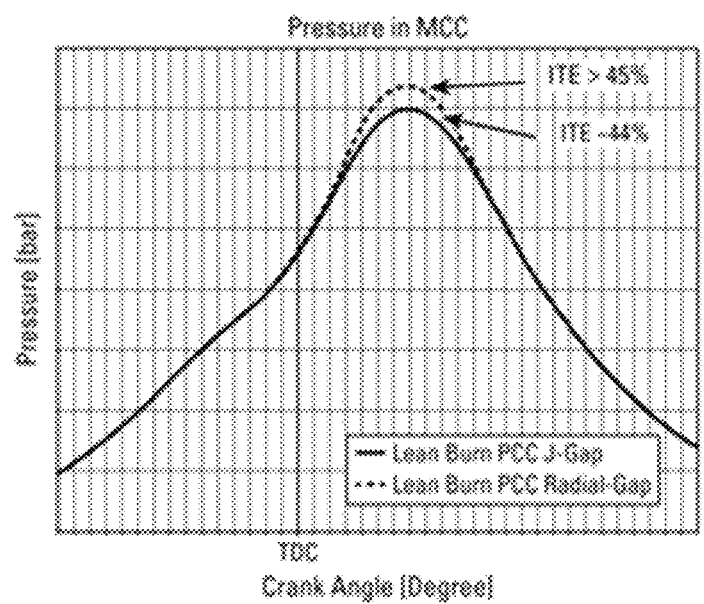

FIGS. 12A-B depict the positive effect of powerful and consistent flame jets on the engine Indicated Thermal Efficiency (ITE) in a lean-burn pre-combustion chamber in accordance with certain embodiments.

Figure 13:
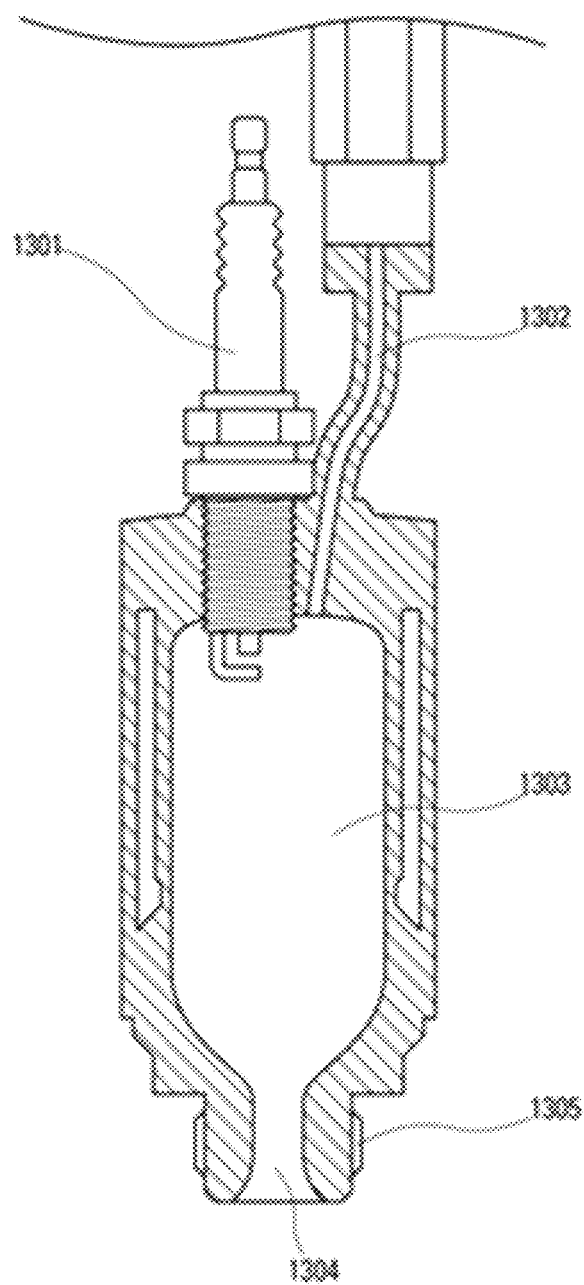

FIG. 13 depicts a pre-combustion chamber with a single nozzle in accordance with certain embodiments.

Figure 14:
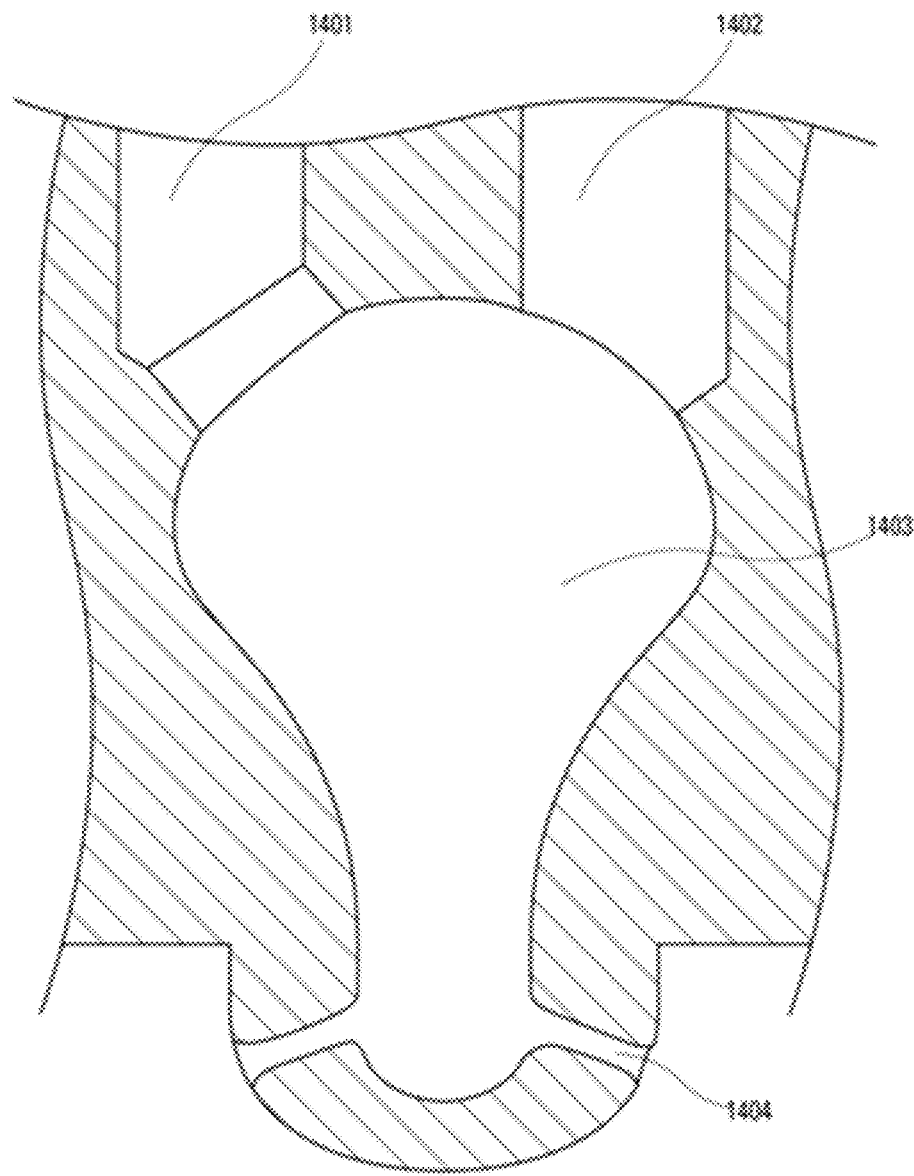

FIG. 14 depicts a pre-combustion chamber with multiple nozzles in accordance with certain embodiments.

Figure 15:
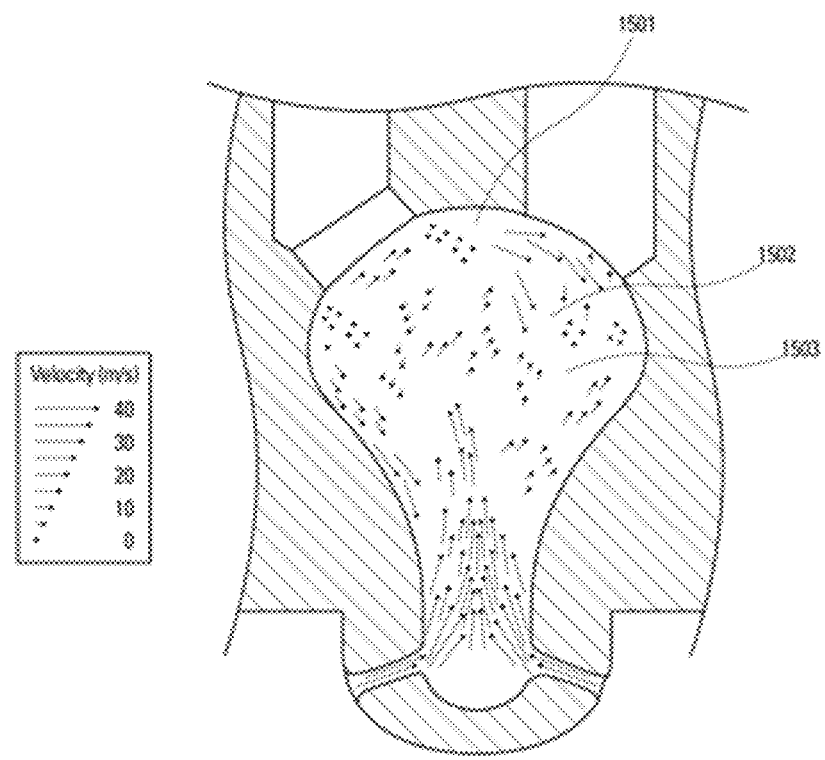

FIG. 15 depicts Computational Fluid Dynamics (CFD) results for a pre-combustion chamber in accordance with certain embodiments.

Figure 16:
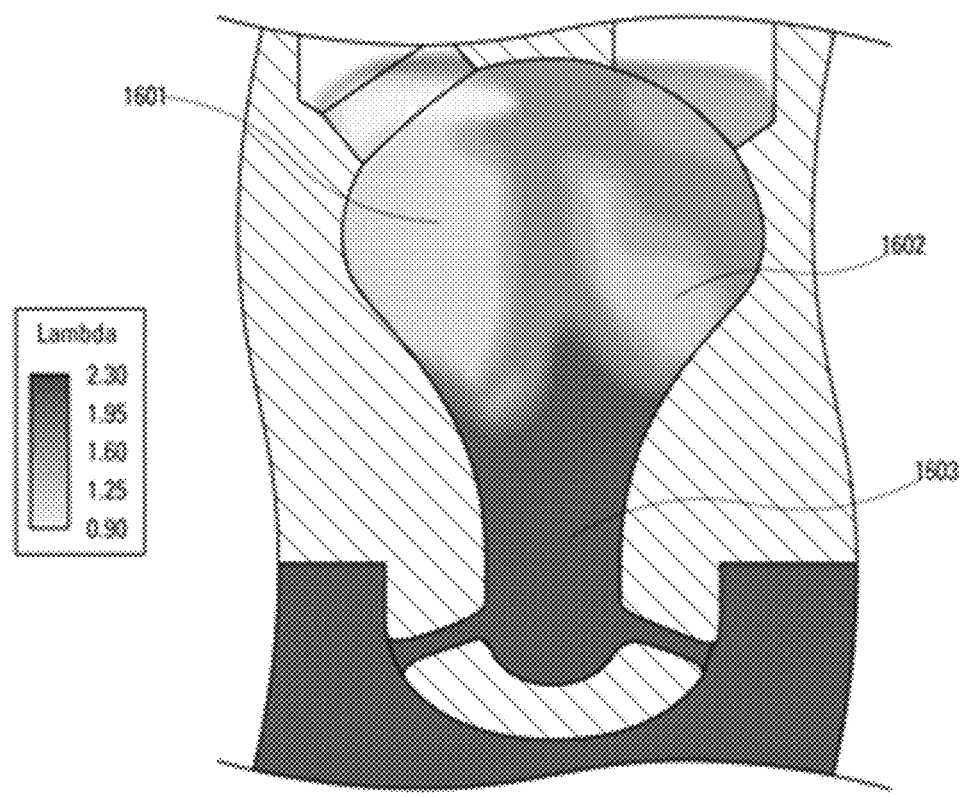

FIG. 16 depicts a lambda distribution for a pre-combustion chamber in accordance with certain embodiments.

Figure 17A:
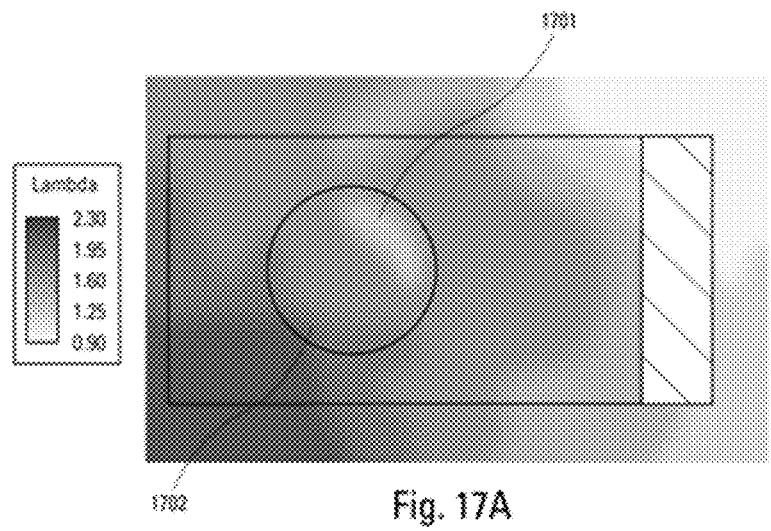
Figure 17B:
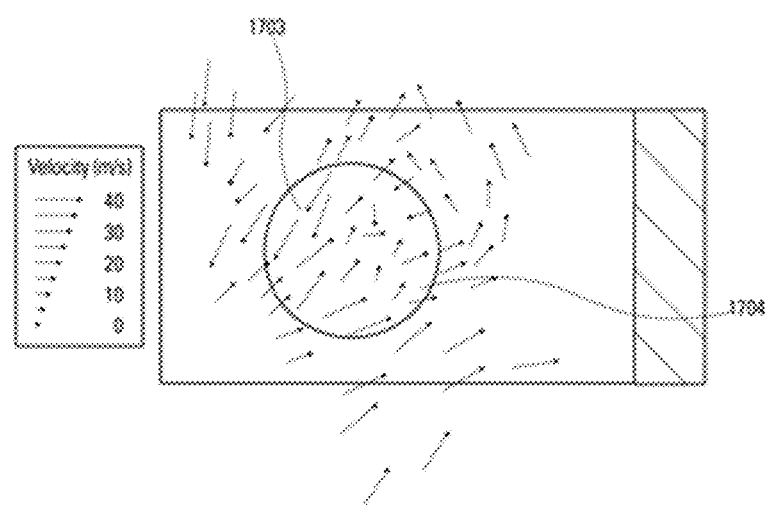

FIGS. 17A-B depict a flow pattern of a fuel-air mixture and a fuel-air mixture distribution in a pre-combustion chamber in accordance with certain embodiments.

Figure 18:
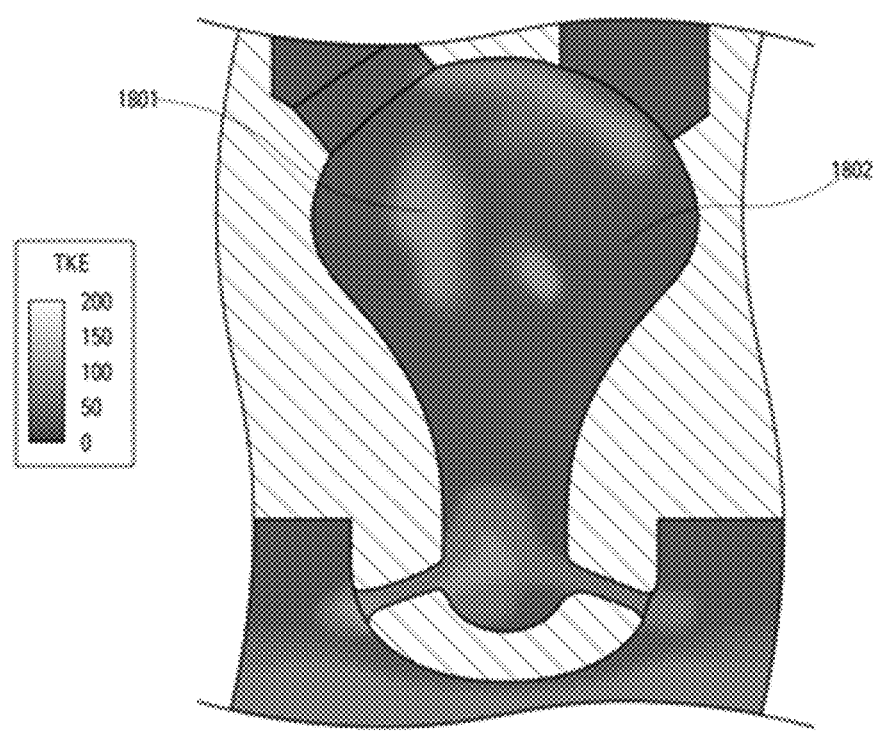

FIG. 18 depicts a low Turbulent Kinetic Energy (TKE) for a pre-combustion chamber in accordance with certain embodiments.

Figure 19A:
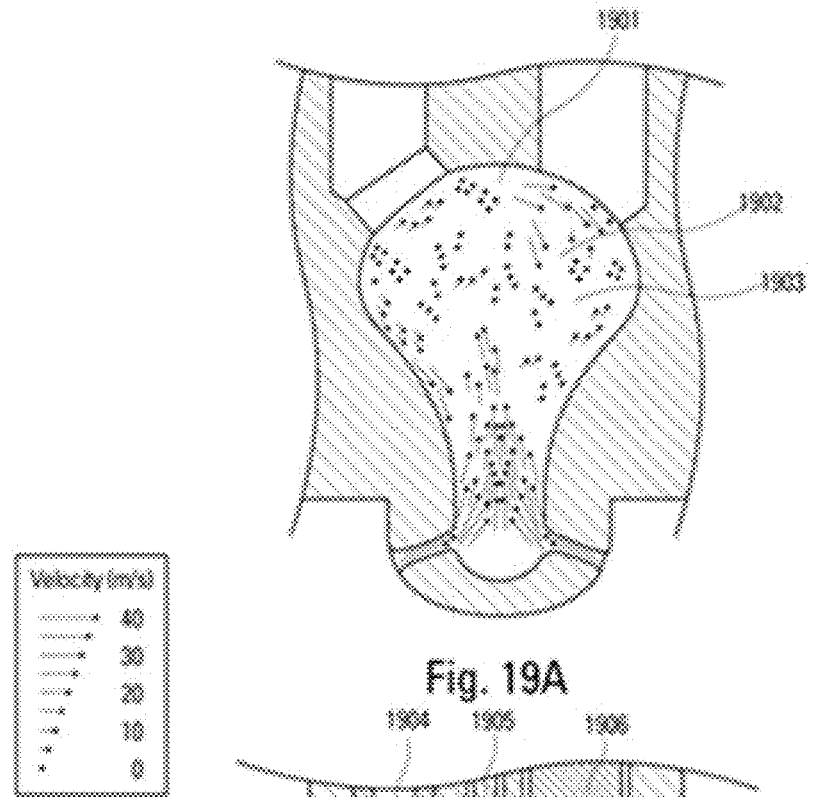
Figure 19B:
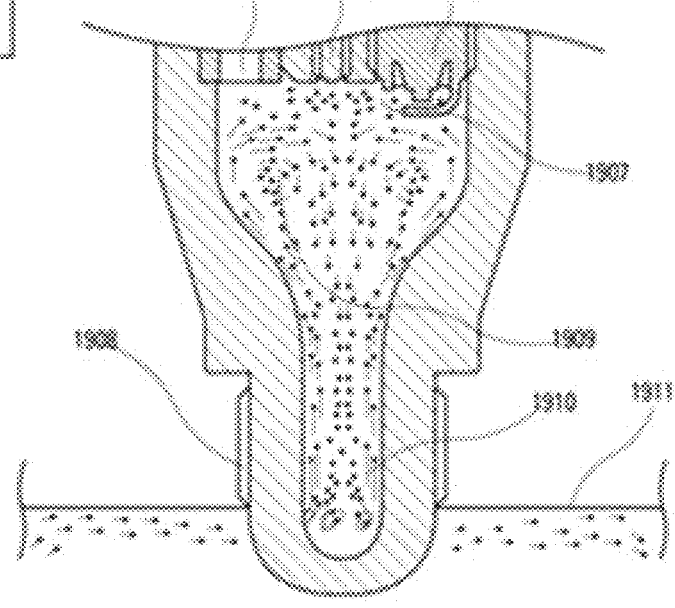

FIGS. 19A-B depict a flow pattern of a fuel-air mixture for a conventional pre-combustion chamber (19A) and in a lean-burn pre-combustion chamber (19B) in accordance with certain embodiments.

Figures 20A, 20B:
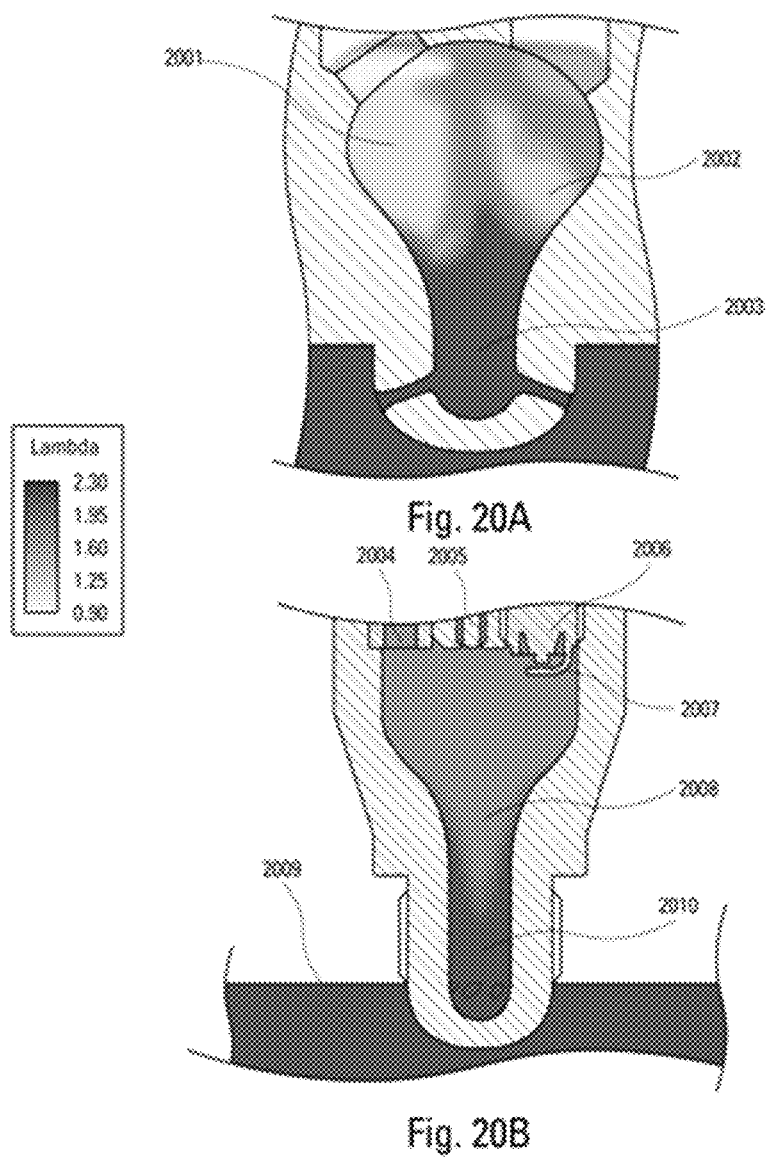
Figure 21A:
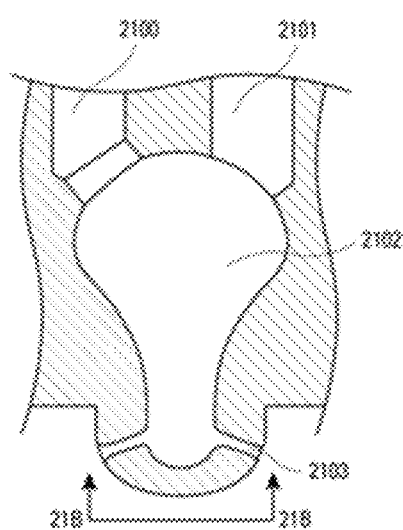
Figure 21C:
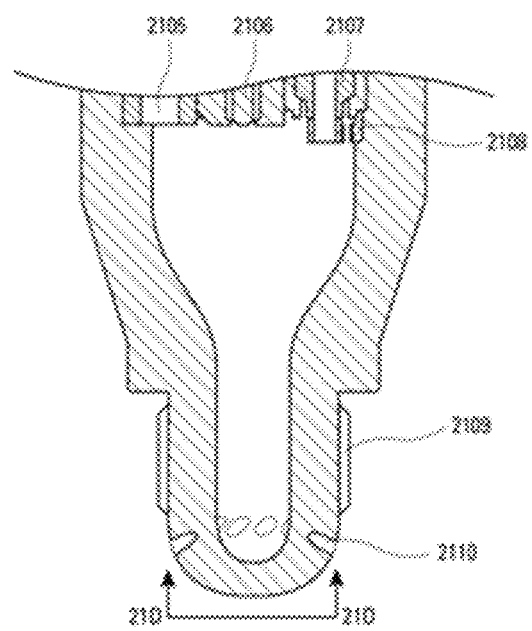
Figure 21B:
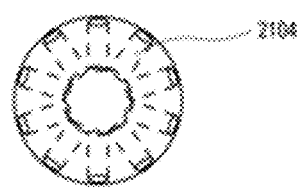
Figure 21D:
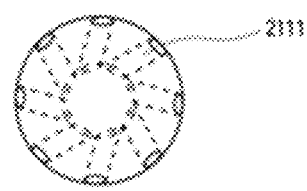
Figures 22A, 22C:
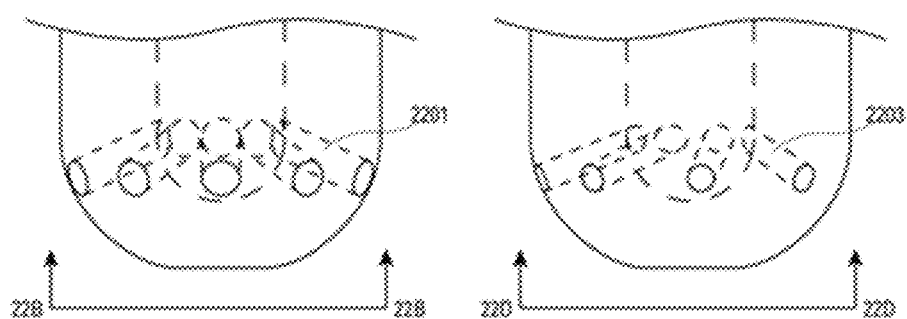
Figures 22B, 22D:
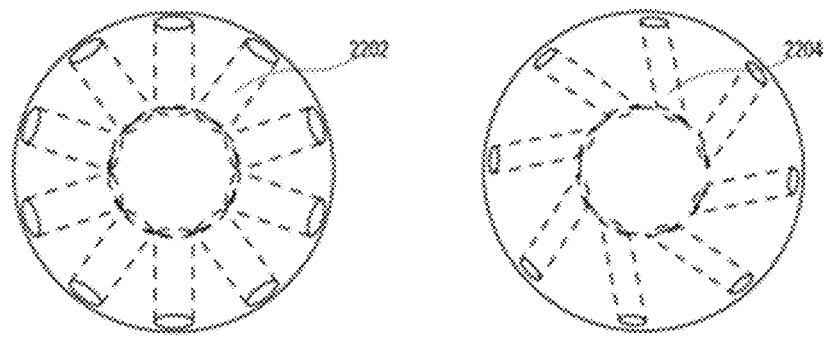

FIGS. 20A-B depict lambda distribution for a conventional pre-combustion chamber (20A) and in a lean-burn pre-combustion chamber (20B) in accordance with certain embodiments.

FIGS. 21A-D depict a conventional pre-combustion chamber (21A-B) and in a lean-burn pre-combustion chamber (21C-D) in accordance with certain embodiments.

FIGS. 22A-D depict nozzle configurations of a conventional pre-combustion chamber (22A-B) and in a lean-burn pre-combustion chamber (22C-D) in accordance with certain embodiments.

FIGS. 23A-F depict flow velocity fields of a conventional pre-combustion chamber (23A-C) and in a lean-burn pre-combustion chamber (23D-F) in accordance with certain embodiments.

Figure 24A:
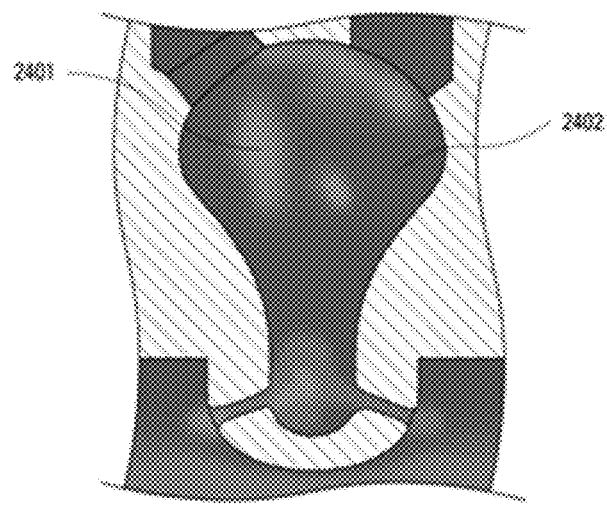
Figure 24B:
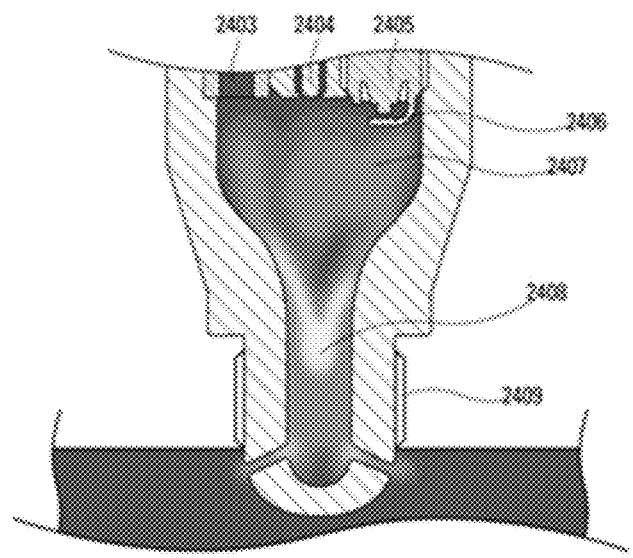

FIGS. 24A-B depict Turbulent Kinetic Energy (TKE) of a fuel-air mixture for a conventional pre-combustion chamber (24A) and in a lean-burn pre-combustion chamber (24B) in accordance with certain embodiments.

FIGS. 25A-D depict flame jet momentum of a conventional pre-combustion chamber (25A-B) and in a lean-burn pre-combustion chamber (25C-D) in accordance with certain embodiments.

Figure 26:
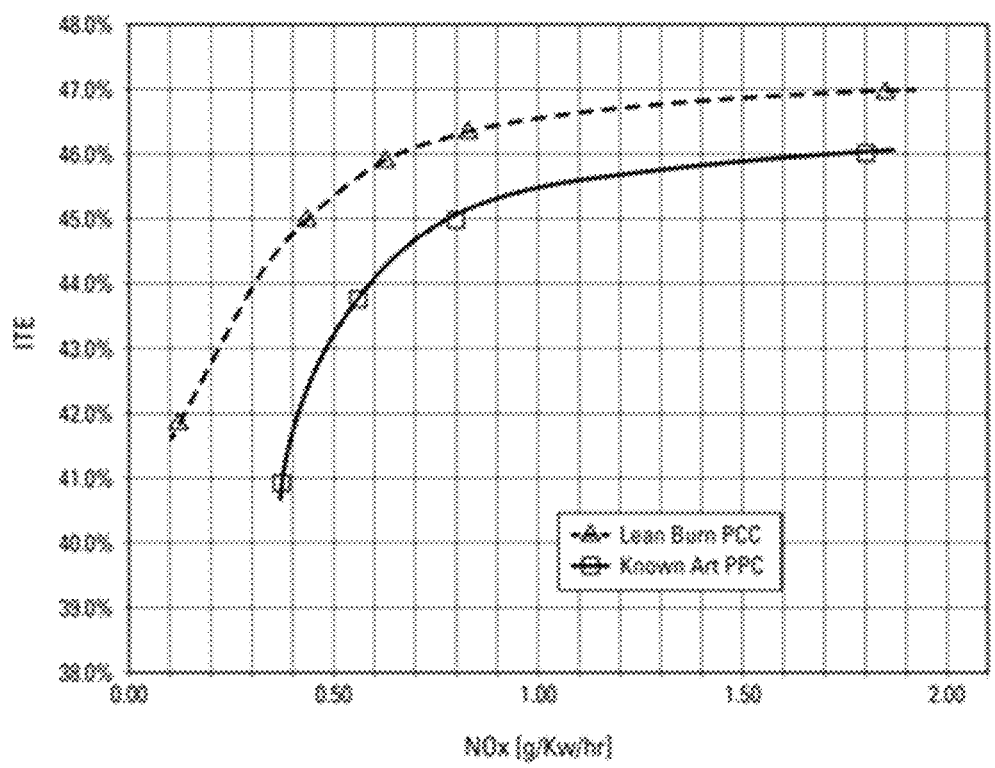

FIG. 26 depicts improved efficiency/emission for a conventional pre-combustion chamber and a lean-burn pre-combustion chamber in accordance with certain embodiments.

Figure 27A:
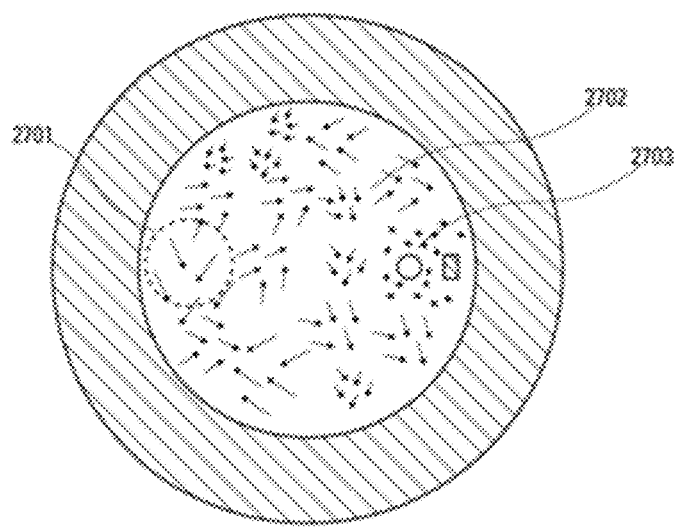
Figure 27B:
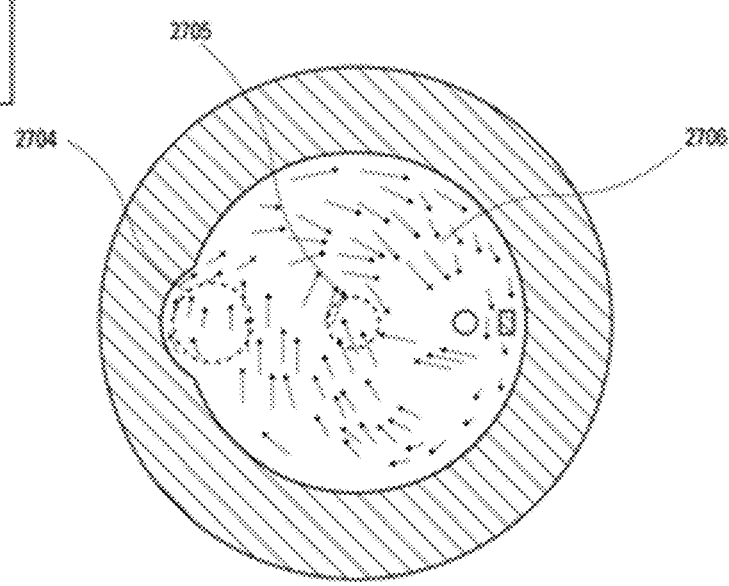

FIGS. 27A-B depict flow velocity fields of a conventional pre-combustion chamber (27A) and in a lean-burn pre-combustion chamber (27B) in accordance with certain embodiments.

Figure 28A:
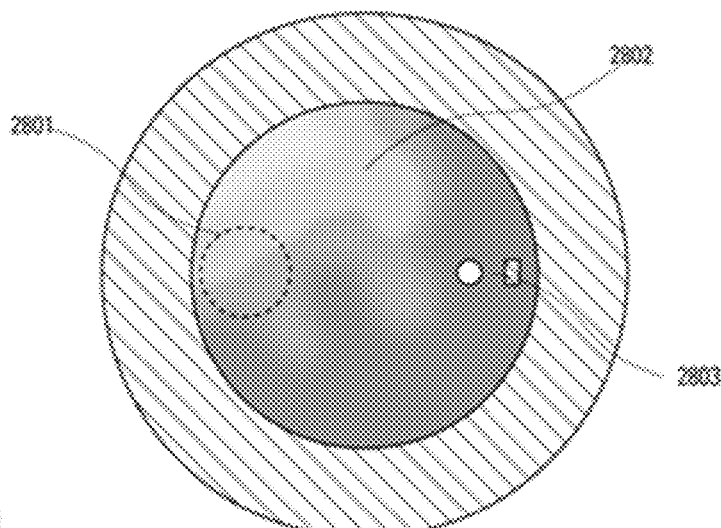
Figure 28B:
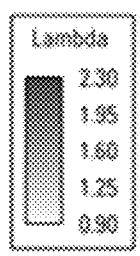
Figure 28B:
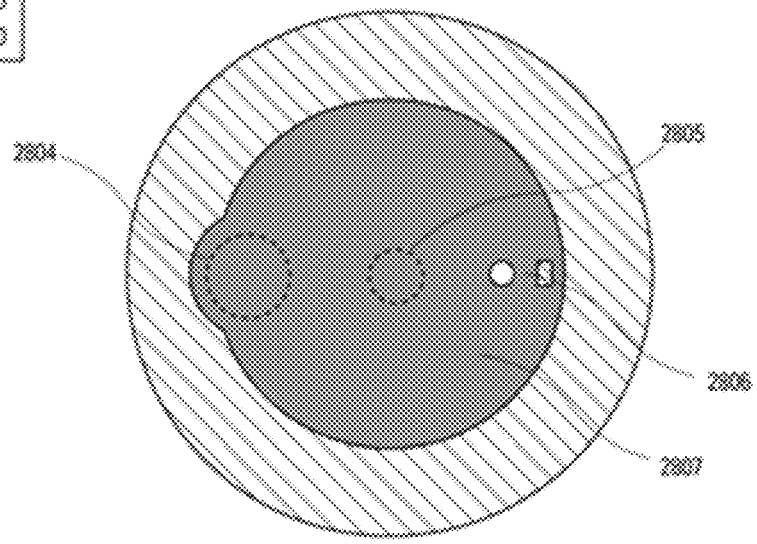

FIGS. 28A-B depict fuel-air mixture distribution of a conventional pre-combustion chamber (28A) and in a lean-burn pre-combustion chamber (28B) in accordance with certain embodiments.

Figure 29A:
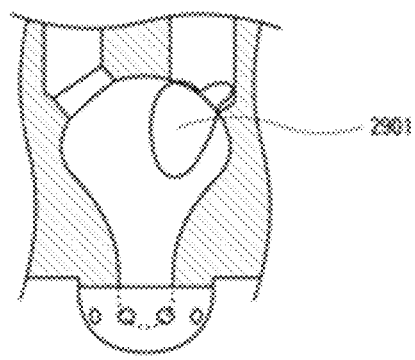
Figure 29B:
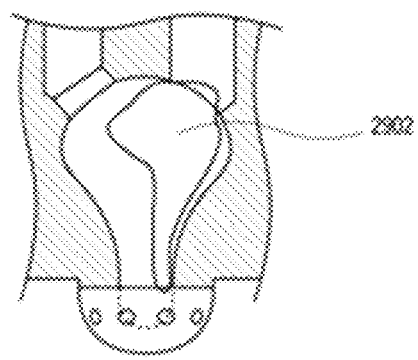
Figure 29C:
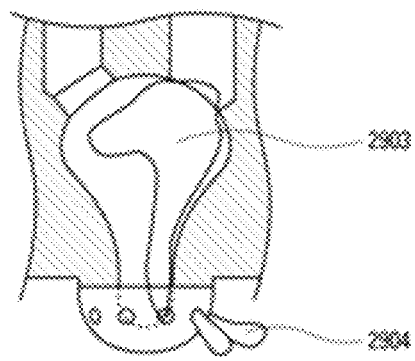

FIGS. 29A-C depict flame front development for a conventional pre-combustion chamber in accordance with certain embodiments.

Figure 30A:
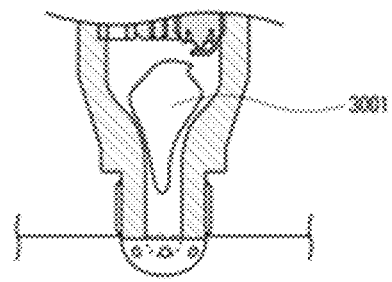
Figure 30B:
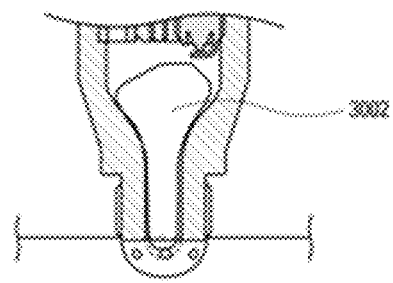
Figure 30C:
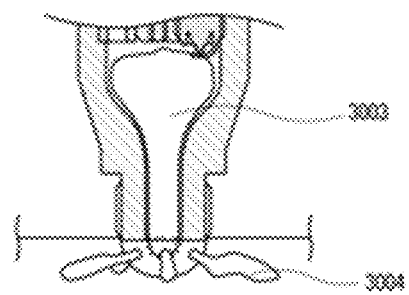

FIGS. 30A-C depict flame front development for a lean-burn pre-combustion chamber in accordance with certain embodiments.

Figure 31:
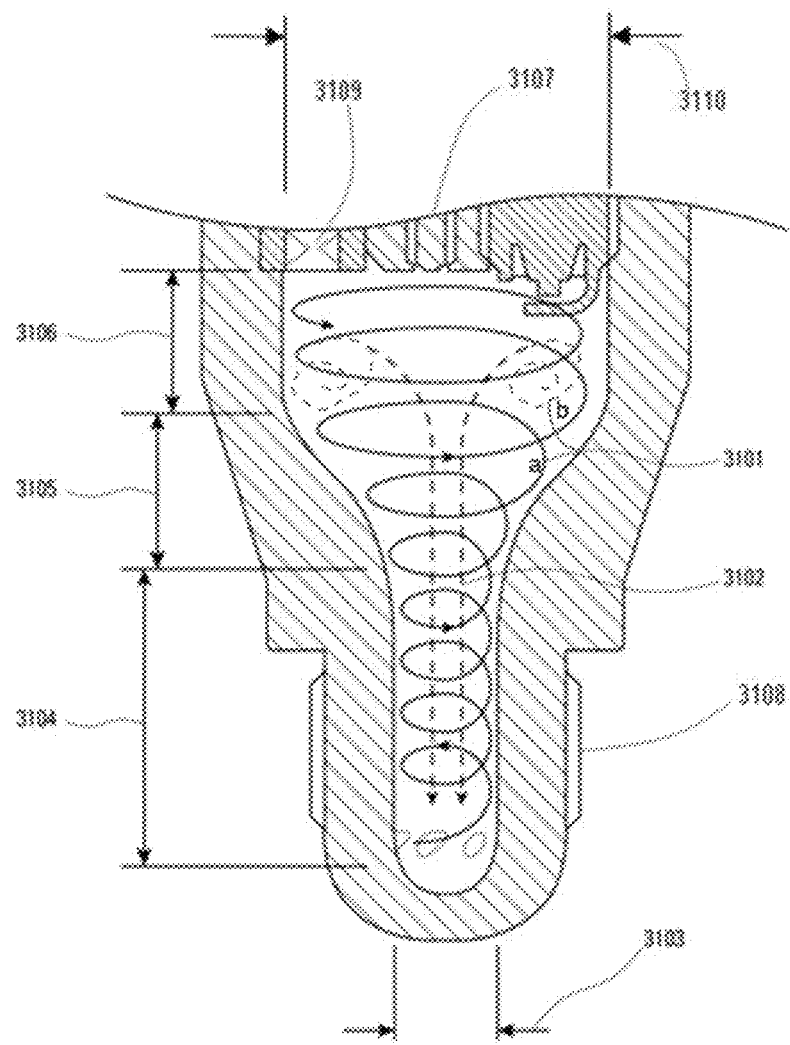

FIG. 31 depicts a lean-burn pre-combustion chamber in accordance with certain embodiments.

V. DETAILED DESCRIPTION

In certain embodiments, a unique flow dynamic method and resulting prechamber structure may ensure very efficient flame propagation of lean fuel-air mixture (lambda=☐) within the PCC of natural gas engines. The lean lambda may be achieved by reducing the amount of fuel admitted to the PCC.

In certain embodiments, a lean burn pre-combustion chamber is disclosed comprising: an external surface and an internal surface enclosing a prechamber volume; one or more nozzles communicating between the external surface and the internal surface, wherein each of the one or more nozzles comprises a nozzle offset; a throat; a spark-gap electrode assembly, comprising: a primary electrode disposed within the prechamber volume; and one or more ground electrodes disposed within the prechamber volume and offset from the primary electrode to form one or more electrode gaps; a fuel admission valve; and an attachment mechanism configured to removably attach the lean burn pre-combustion chamber to a cylinder head. The attachment mechanism may comprise a plurality of external threads configured to removably engage a plurality of internal threads on the cylinder head or a clamp for clamping the lean burn pre-combustion chamber to the cylinder head. The pre-combustion chamber may further comprise an induction zone comprising the one or more nozzles, a transition zone comprising the throat, and a stabilization zone comprising the spark-gap electrode assembly and the fuel admission valve. The induction zone may comprise a high velocity counter flow. The plurality of external threads may comprise a 22 mm×1.5 or ⅞"-18 thread size to permit the pre-combustion chamber to be screwed into the cylinder head in place of a spark plug. The nozzle offset and the induction diameter may be configured to generate a compound vortex flow pattern in the prechamber volume having a primary vorticity in a plane orthogonal to an axial direction and a second toroidal vorticity forming a vortex ring pattern around the axial direction. The vortex ring may comprise peripheral velocities higher than inner velocities causing a flame to be drawn into the vortex ring, to become energized and to develop at accelerated rates. Any droplet of lube oil engaged in the compound vorticity pattern may undergo a rapid vaporization and mixing with surrounding fuel-mixture to prevent the autoignition of the droplet of lube oil. The compound vorticity pattern may be configured to prevent unburned fuel from being ejected ahead of one or more flame jets, thereby avoiding burning rich fuel-air mixture and avoid the formation of high concentrations of NOx and CO. The compound vorticity pattern may comprise relatively higher velocities in the induction zone and relatively lower velocities in the stabilization zone. The compound vorticity pattern may comprise a substantially uniformly distributed fuel-air mixture with a relatively leaner lambda in the induction zone and a relatively richer lambda in the stabilization zone. The fuel admission valve may comprise a reduced flow admission valve configured to deliver up to about 70% lower fuel flow rates to the pre-combustion chamber to achieve lean fuel-air mixtures. The nozzle offset may be between about 1 mm and about 10 mm. The nozzle offset may be proportional to at least one of an engine cylinder bore diameter, a piston speed, a combustion chamber flow velocity and one or more charge densities. The lean-burn-prechamber may further comprise an induction diameter between about 5 mm and about 30 mm. The lean burn pre-combustion chamber may further comprise an induction diameter proportional to at least one of an engine cylinder bore diameter, a piston speed, a combustion chamber flow velocity and one or more charge densities. The lean burn pre-combustion chamber may further comprise an induction length between about 3 and about 9 times an induction diameter. The lean burn pre-combustion chamber may further comprise an induction length proportional to at least one of an engine cylinder bore diameter, a piston speed, a combustion chamber flow velocity and one or more charge densities. The lean burn pre-combustion chamber may further comprise a transition length between about 0.25 and about 1.75 times an induction length. The lean burn pre-combustion chamber may further comprise a transition length proportional to at least one of an engine cylinder bore diameter, a piston speed, a combustion chamber flow velocity and one or more charge densities. The lean burn pre-combustion chamber may further comprise a stabilization length between about 0.25 and about 2.5 times an induction length. The lean burn pre-combustion chamber may further comprise a stabilization length proportional to at least one of an engine cylinder bore diameter, a piston speed, a combustion chamber flow velocity and one or more charge densities. The fuel-air mixture may comprise a compound vortex flow with velocities up to about 300 m/s. The fuel-air mixture may comprise axial velocities up to 200 m/s. The fuel-air mixture may comprise a uniform fuel-air mixture distribution with lambda between about 1.2 and about 2.0 or between about 1.6 and about 1.9. The fuel-air mixture may comprise lambda stratification in the axial direction in the range of lambda of about 0.1 to about 1.0 with richer fuel-air mixture in the stabilization zone and leaner fuel-air mixture in the induction zone. The fuel-air mixture may comprise Turbulent Kinetic Energy (TKE) between about 100 $m^2/s^2$ to about 200 $m^2/s^2$ with higher TKE towards the one or more nozzle and lower TKE toward the spark-gap electrode assembly. The lean burn pre-combustion chamber may further comprise a combustion ionization sensor proximate the core of the compound vortex flow. The lean burn pre-combustion chamber may further comprise a ratio of maximum diameter to minimum diameter of greater than about 2. The lean burn pre-combustion chamber may further comprise a ratio of total length to maximum diameter of greater than about 2. The fuel air mixture may further comprise a progressive flame growth from a rich lambda region to a lean lambda region in the radial and axial directions to achieve nearly complete burning of the fuel-air mixture in the pre-combustion chamber prior to a plurality of flame jets exiting the pre-combustion chamber.

In certain embodiments, a method of lean-burn combustion is disclosed comprising: providing a pre-chamber comprising: an external surface and an internal surface enclosing a prechamber volume; one or more nozzles communicating between the external surface and the internal surface, wherein each of the one or more nozzles comprises a nozzle offset; a throat; a spark-gap electrode assembly, comprising: a primary electrode disposed within the prechamber volume; and one or more ground electrodes disposed within the prechamber volume and offset from the primary electrode to form one or more electrode gaps; and a fuel admission valve; removably attaching the pre-chamber to a cylinder head; introducing at least one fuel in-filling stream to the pre-chamber volume through the fuel admission valve; and introducing a spark across at least one of the one or more electrodes gaps to ignite the fuel-air mixture. The pre-chamber further may comprise a plurality of external threads; and removably attaching the pre-chamber to the cylinder head may comprise screwing the plurality of external threads into a plurality of internal threads on a cylinder head. Removably attaching the pre-chamber to the cylinder head may comprise clamping the pre-chamber to the cylinder head.

The pre-combustion chamber may further comprise an induction zone comprising the one or more nozzles, a transition zone comprising the throat, and a stabilization zone comprising the spark-gap electrode assembly and the fuel admission valve. The induction zone may comprise a high velocity counter flow. The plurality of external threads may comprise a 22 mm×1.5 or ⅞"-18 thread size to permit the pre-combustion chamber to be screwed into the cylinder head in place of a spark plug. The method may further comprise generating a compound vortex flow pattern in the prechamber volume having a primary vorticity in a plane orthogonal to an axial direction and a second toroidal vorticity forming a vortex ring pattern around the axial direction. The vortex ring may comprise peripheral velocities higher than inner velocities causing a flame to be drawn into the vortex ring, to become energized and to develop at accelerated rates. The method may further comprise rapidly vaporizing and mixing with surrounding fuel any droplet of lube oil that becomes engaged in the compound vorticity pattern mixture to prevent the autoignition of the droplet of lube oil. The compound vorticity pattern may prevent unburned fuel from being ejected ahead of one or more flame jets, thereby avoiding burning rich fuel-air mixture and avoid the formation of high concentrations of NOx and CO. The compound vorticity pattern may comprise relatively higher velocities in the induction zone and relatively lower velocities in the stabilization zone. The compound vorticity pattern may comprise a substantially uniformly distributed fuel-air mixture with a relatively leaner lambda in the induction zone and a relatively richer lambda in the stabilization zone. The fuel admission valve may comprise a reduced flow admission valve configured to deliver up to about 70% lower fuel flow rates to the pre-combustion chamber to achieve lean fuel-air mixtures. The nozzle offset may be between about 1 mm and about 10 mm. The nozzle offset may be proportional to at least one of an engine cylinder bore diameter, a piston speed, a combustion chamber flow velocity and one or more charge densities. The pre-combustion chamber may further comprise an induction diameter between about 5 mm and about 30 mm. The pre-combustion chamber may further comprise an induction diameter proportional to at least one of an engine cylinder bore diameter, a piston speed, a combustion chamber flow velocity and one or more charge densities. The pre-combustion chamber may further comprise an induction length between about 3 and about 9 times an induction diameter. The pre-combustion chamber may further comprise an induction length proportional to at least one of an engine cylinder bore diameter, a piston speed, a combustion chamber flow velocity and one or more charge densities. The pre-combustion chamber may further comprise a transition length between about 0.25 and about 1.75 times an induction length. The pre-combustion chamber may further comprise a transition length proportional to at least one of an engine cylinder bore diameter, a piston speed, a combustion chamber flow velocity and one or more charge densities. The pre-combustion chamber may further comprise a stabilization length between about 0.25 and about 2.5 times an induction length. The pre-combustion chamber may further comprise a stabilization length proportional to at least one of an engine cylinder bore diameter, a piston speed, a combustion chamber flow velocity and one or more charge densities. The fuel-air mixture may comprise a compound vortex flow with velocities up to about 300 m/s. The fuel-air mixture may comprise axial velocities up to 200 m/s. The fuel-air mixture may comprise a uniform fuel-air mixture distribution with lambda between about 1.2 and about 2.0 or between about 1.6 and about 1.9. The fuel-air mixture may comprise lambda stratification in the axial direction in the range of lambda of about 0.1 to about 1.0 with richer fuel-air mixture in the stabilization zone and leaner fuel-air mixture in the induction zone. The fuel-air mixture may comprise Turbulent Kinetic Energy (TKE) between about 100 $m^2/s^2$ to about 200 $m^2/s^2$ with higher TKE towards the one or more nozzle and lower TKE toward the spark-gap electrode assembly. The pre-combustion chamber may further comprise a combustion ionization sensor proximate the core of the compound vortex flow. The pre-combustion chamber may further comprise a ratio of maximum diameter to minimum diameter of greater than about 2. The pre-combustion chamber may further comprise a ratio of total length to maximum diameter of greater than about 2. The method may further comprise progressively growing a flame from a rich lambda region to a lean lambda region in the radial and axial directions to achieve nearly complete burning of the fuel-air mixture in the pre-combustion chamber prior to a plurality of flame jets exiting the pre-combustion chamber.

Figure 1:
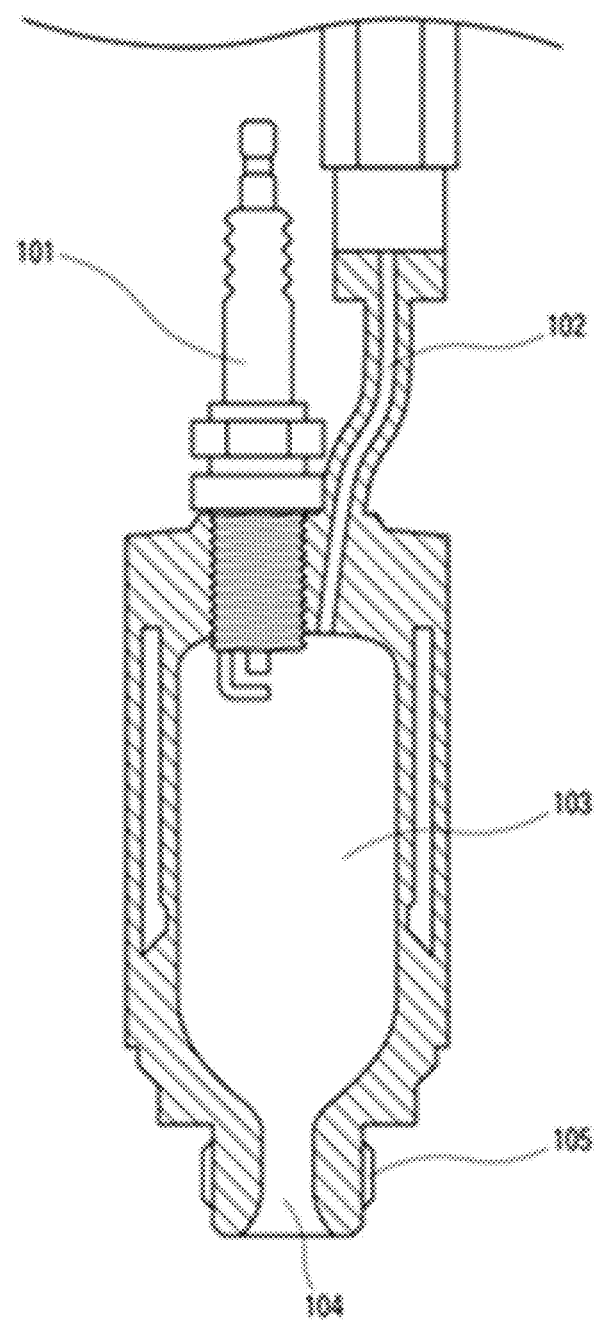
FIG. 1 depicts a pre-combustion chamber in accordance with certain embodiments.

A PCC may include an enclosed volume, which may be approximately 1-3% of the main combustion chamber (MCC) volume, with a spark plug and a fuel passage located on the opposite side of the PCC discharge orifice/s. Such a device may create a rich fuel air mixture in a relatively small volume, which can be reliably ignited, resulting in a high velocity flame jet/torch emerging from the prechamber into the main chamber, thereby enhancing combustion of lean fuel air mixtures. An example of such a device is shown in the FIG. 1. It can be seen that (101) is a spark plug, (102) is a fuel passage, (103) is the prechamber volume, (104) is the discharge nozzle that generates the flame torch and (105) may be a 22 mm×1.5 or ⅞"-18 thread size, allowing for the PCC to be screwed in the cylinder head in place of a spark plug.

Figure 2:
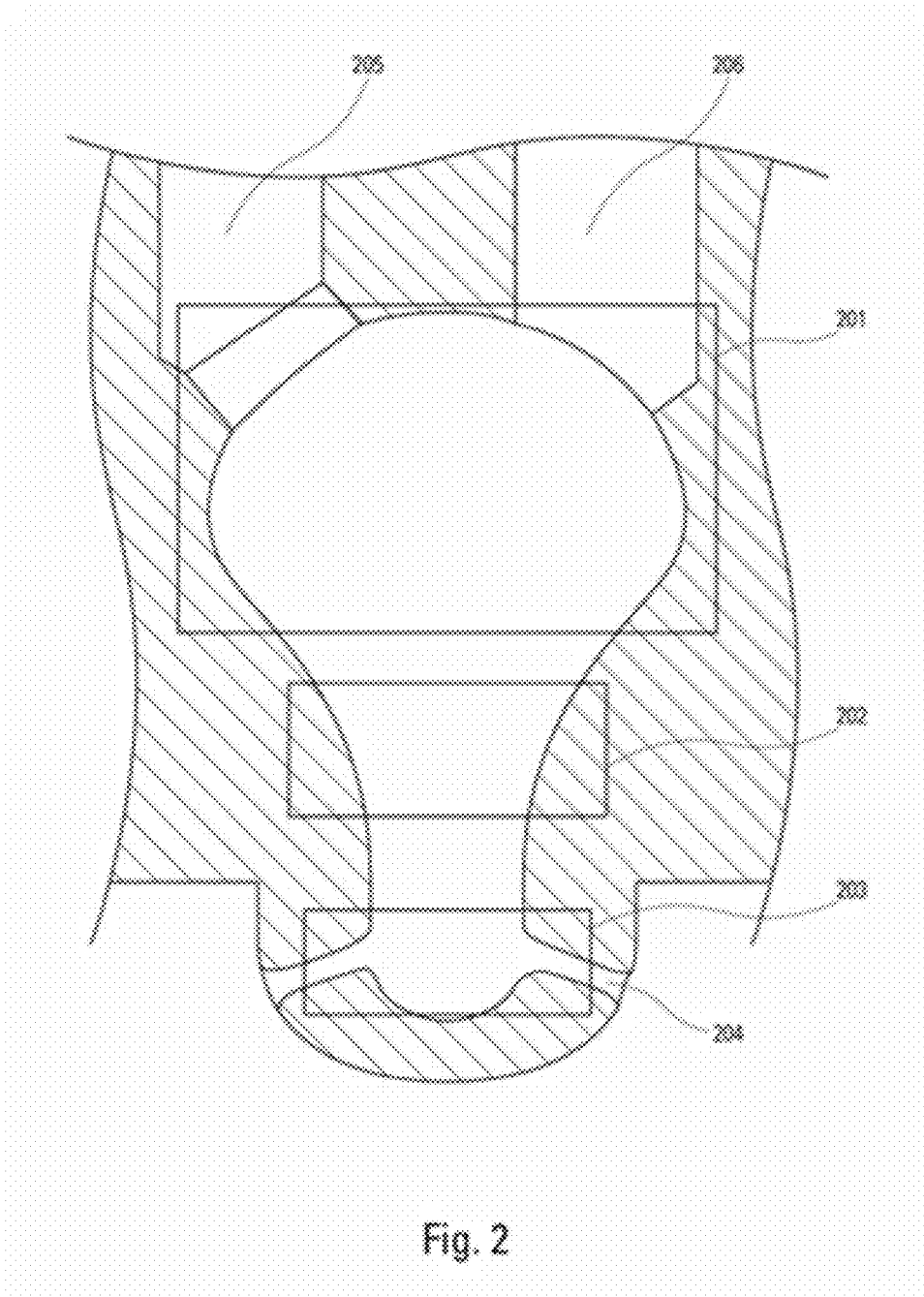
FIG. 2 depicts a pre-combustion chamber in accordance with certain embodiments.

Another example of a PCC is provided in FIG. 2. It can be seen that, the general layout of the PCC may be maintained with the fuel admission valve receptacle (205) and the spark plug receptacle (206) placed side by side at the top of the PCC. In this case, however, the single discharge nozzle may be replaced by multiple discharge nozzles (204). While this can be an improvement over the single nozzle type, it may still present the limitation of requiring rich fuel air mixture to combust efficiently and to generate high power flame torches. This limitation may be due to the fact that the combustion occurs in a relatively small space where the ratio between the surface and the volume may be relatively high causing relatively high heat loss, hence, the high tendency to quench the flame. In addition, due to the large diameter in the nozzles' area, this type of PCC cannot be screwed in the cylinder head in place of a spark plug.

With reference to FIG. 2, the general configuration of a PCC may be divided into 3 critical zones for efficient lean burn combustion:

Zone 1, defined as "induction" zone (203), which includes the nozzles. This zone may define the main flow dynamic pattern during the compression phase.

Zone 2, defined as "transition" zone (202), which includes the throat. This zone may define the transition from high velocity to low velocity flow.

Zone 3, defined as stabilization zone (201), which includes the fuel admission valve and the spark plug.

In certain embodiments, with the unique flow dynamic method and resulting prechamber structure provided by this invention, it may be possible to organize the flow and the fuel-air mixture distribution in a way to achieve very efficient combustion of lean fuel air mixtures in the PCC, while maintaining the feature of being fitted with a 22 mm or ⅞" thread size, (605 and 705), to be screwed in directly in the cylinder head in place of a spark plug.

In certain embodiments as shown in FIGS. 3A-B, a screw-in PCC, with thread arrangement (301) may have nozzle offset (303) and induction diameter (302) of predetermined values which may be suitable to generate a rotational flow combined with an axial flow resulting in a compound vortex flow pattern having a primary vorticity pattern in a plane orthogonal to the axial direction and a secondary toroidal vorticity, forming a vortex ring pattern around the axial direction. This type of flow may have relatively higher velocities in the zone 1 of the nozzles (204) and relatively lower velocities in the zone 3 of the spark plug (201). In certain embodiments, once the flame has initiated in a relatively quiescent area, it may be subsequently drawn into a vortex ring where the peripheral velocities may be higher than the inner velocities. Under this condition, the flame may become energized and may develop at accelerated rates. This also may be the result of the vortex ring being impervious to heat loss, hence, retaining the energy within the vortex. As a result, the combustion of leaner mixtures may be achieved very efficiently.

In certain embodiments as shown in FIG. 3C, a lean-burn pre-combustion chamber (304) may incorporate sleeve (305) configured for receiving spark plug (306). The sleeve may further include fuel passage (307) for admitting fuel into lean-burn pre-combustion chamber (304). The pre-combustion chamber may include a clamp (308) for removably attaching the pre-combustion chamber to a cylinder head (309) and a seal (310) to prevent leakage of combustion gases.

In certain embodiments, due to the presence of the compound vortex flow pattern in zone 3 (201), any droplet of lube oil engaged in this flow pattern may undergo a rapid vaporization and mixing with the surrounding. This particular characteristic may prevent the autoignition of the liquid droplets which are known to cause combustion instability in high power density engines. Furthermore, zone 1 (203) may be characterized by high velocity counter flow resulting in high Turbulence Kinetic Energy (TKE). This high TKE also promotes rapid vaporization and mixing of the lube oil droplets entering the PCC, thereby assisting in preventing the autoignition of the liquid droplets which are known to cause combustion instability in high power density engines.

In certain embodiments, the fuel-air mixture (lambda=☐) in the PCC may be uniformly distributed with a richer lambda in the spark plug zone 3 and a leaner lambda in the nozzle zone 1. This may prevent the ejection from the PCC of unburned fuel ahead of the flame jet/s, thereby avoiding burning overly rich mixture which may result in the formation of high concentrations of NOx and CO.

In certain embodiments shown in FIGS. 4A-B as a comparison between the angled nozzles (402) of this invention, necessary to achieve the unique and improved flow dynamic claimed in lean-burn PCC, and the straight nozzles (401) of a conventional PCC. It can also be seen that, due to the relatively smaller diameter of the nozzle area of lean-burn PCC, a 22 mm or ⅞" thread (301) may be used to screw lean-burn PCC in the cylinder head in place of a conventional spark plug.

In certain embodiments, as a result of the stable flow velocity and lambda distributions within the PCC, a region with negligible flow velocity and fuel concentration fluctuations may be achieved at the top of the PCC, in between the fuel valve (501) and the spark plug (503) as shown in FIG. 5. This region may constitute an ideal location for a combustion ionization sensor (502) to generate a reliable and consistent signal with a substantially reduced noise from flow velocities and fuel concentration fluctuations. Such a signal may be used to precisely control the amount of fuel admitted to the PCC, hence, maintaining the operation of the PCC within the desired narrow range that maximizes the engine efficiency and reduces the NOx emissions. The PCC may further include nozzles (504) and thread arrangement (505).

In certain embodiments, a lean burn PCC is shown in the FIGS. 6A-B including fuel valve (601) and a combustion ionization sensor (602). It can be seen that, in this case, a radial gap spark plug (603) with electrode gap (604) may be used as the ignition source for the lean burn PCC. The PCC may further include nozzles (606/607). FIGS. 7A-B show the same concept including fuel valve (701) and a combustion ionization sensor (702), but with the use of a J-gap type spark plug (703) with electrode gap (704). The PCC may further include nozzles (706/707). Due to the difference in spark plug electrode gap design, the geometry of the stabilization zone, the transition zone and the nozzle area in the two PCCs may be somewhat different. Either embodiment may be fitted with a 22 mm×1.5 or ⅞"-18 thread size (605 and 705), allowing the lean burn PCC to screw into the cylinder head in place of a conventional spark plug.

In certain embodiments, computational fluid dynamics (CFD) may be used. In certain embodiments shown in FIGS. 8A-B, representing the flow velocity vectors, when the PCC is configured according to the teachings of certain embodiments, a rotational flow (809/810/811) may be combined with an axial flow (807) resulting in a compound vortex structure (804) having a primary vorticity (809/810/811) in a plane orthogonal to the axial direction (shown in FIG. 8B) and a secondary toroidal vorticity, forming a forced vortex ring (805), around the axial direction. The flow velocity may be higher in the region of the nozzles and lower in the region of the spark plug (803), fuel valve (801) and combustion ionization sensor (802). Furthermore, in certain embodiments shown in FIGS. 9A-B, it can be seen that the air-fuel mixture distribution (lambda=☐) may be uniformly distributed, with a richer lambda (903) in proximity of the fuel valve (901 and 911), combustion ionization sensor (902 and 912) and spark plug (904 and 913) with electrode gap (905). The lambda may be even higher in region (906) and leaner in the region of the nozzles (910). Either embodiment may be fitted with a 22 mm×1.5 or ⅞"-18 thread size (806 and 907), allowing the lean burn PCC to screw into the cylinder head (808) in place of a conventional spark plug.

In certain embodiments, FIGS. 10A-B depict the flow velocity and the lambda distributions resulting from a lean PCC with a radial gap (604) spark plug (603). It can be seen that across the entire surface of the gap (1001) and (1003), the velocity (1002) and the lambda (1004) may be very uniform. These conditions may allow for a consistent flame kernel growth, hence, minimizing the cyclic variations.

In certain embodiments, a unique distribution of flow velocity and lambda combined with the vortex ring may enable achieving very efficient combustion in the lean PCC. In such embodiments, very stable and powerful flame jets or torches (1106/1107) may emerge from the nozzles into the main chamber as illustrated by the combustion CFD simulations shown in FIGS. 11A-B. These embodiments may include fuel valve (1101), combustion ionization sensor (1102), spark plug (1103) with spark plug gap (1104). These embodiments may be fitted with a 22 mm×1.5 or ⅞"-18 thread size (1105), allowing the lean burn PCC to screw into the cylinder head in place of a conventional spark plug.

In certain embodiments as shown in FIGS. 12A-B, powerful and consistent flame jets may have a positive effect on the engine Indicated Thermal Efficiency (ITE). It can be seen that different combustion pressures may be achieved with different styles of spark plugs (i.e., J-gap or Radial gap). However, regardless the type of spark plug used, very efficient combustion in PCC may result in very efficient combustion in the Main Combustion Chamber (MCC), which may yield engine Indicated Thermal Efficiency (ITE) in excess of 45%.

Depicted in the FIG. 13 is an example of a conventional PCC with a single nozzle, including spark plug (1301), fuel passage (1302), prechamber volume (1303), discharge nozzle (1304) that generates the flame torch and thread arrangement (1305) may have a 22 mm×1.5 or ⅞"-18 thread size, allowing for the PCC to be screwed in the cylinder head in place of a spark plug. The performance of this type of PCC has proven to be inferior to that of a multiple nozzles PCC shown in FIG. 14, which includes fuel passage receptacle (1401), spark plug receptacle (1402), prechamber volume (1403), and discharge nozzles (1404). For this reason, the multiple nozzles PCC is considered the state of the art of PCC and is used for comparison to the lean burn PCC of certain embodiments.

In certain embodiments as shown in FIG. 15 are the CFD simulation results for the conventional PCC configuration. It can be seen that the flow velocity may be highly unorganized. There may be regions of relatively high velocity in the upward direction (1503), next to regions of relatively higher velocity in the downward direction (1502), next to regions of relatively lower velocity (1501) in the orthogonal plane.

The lambda distribution also may be highly heterogeneous, which may be due to the flow not following a consistent pattern in the conventional PCC of FIG. 15. In certain embodiments, FIG. 16 shows the lambda distribution in this type of PCC having large pockets of overly rich lambda (1601) and (1602), where the flame propagation speed drops significantly causing an increase in heat loss, hence, a loss of efficiency. FIG. 16 also displays a region of leaner lambda (1603).

Non-uniform flow velocity and lambda distributions also may be present in the spark gap as shown in FIGS. 17A-B. It can be seen that regions of high velocity in one direction (1703) may be contrasted by regions in which the velocity is somewhat lower and in the opposite direction (1704). Similarly, it can be seen that large pockets of overly rich lambda (1701) and large pockets of overly lean lambda (1702) may be present within the spark gap. This condition may add further variability to the combustion process in the PCC.

In certain embodiments, a low Turbulent Kinetic Energy (TKE) as shown in the FIG. 18 may be found in conventional PCCs (1801 and 1802). The low TKE may cause a low flame propagation speed in the PCC which may result in increased heat losses and reduced flame jet/torch momentum. As a result, the overall effectiveness of the PCC may be low.

In certain embodiments and the proper use of advanced computational flow dynamic (CFD) it may be possible to devise a retrofitable lean burn Pre-combustion Chamber (PCC) that may be configured to screw into the cylinder head of a large bore Natural Gas engine, replacing a 22 mm×1.5 or ⅞"-18 thread size spark plug. This new type of PCC construction may be capable of sustaining efficient combustion of lean mixtures (lambda range of λ=1.2-2.0) within the PCC. Such lean mixtures may be achieved by reducing the amount of fuel admitted to the PCC. Operations with a lean PCC may significantly improve the engine Brake Thermal Efficiency (BTE) up to about 5 percentage points, while maintaining very low NOx levels down below 0.25 g/bhp-hr and with very low combustion variability below about 2% coefficient of variation (COV). Furthermore, due to the stability and uniformity of flow velocity and fuel-air mixture (lambda) distributions in certain embodiments, it may be possible to use a combustion ionization sensor that may provide a dependable combustion ionization feedback control signal and may allow operating the PCC of this invention within a narrow range of maximum efficiency and minimum NOx and CO emissions.

In certain embodiments as shown in FIGS. 19A-B, a comparison is shown between the flow dynamic characteristics of a conventional PCC and a lean-burn PCC of certain embodiments. The conventional PCC may have a chaotic and unstable flow (1901, 1902, and 1903), and the flow in the lean-burn PCC may be characterized by an organized flow consisting of an orthogonal vortex (1907), a vortex ring (1909) and an axial vortex flow pattern (1910). Also, portrayed in FIG. 19B is the ion sensor (1905) located in a relatively quiescent zone, between the fuel induction port (1904) and the spark plug (1906). The other features depicted in FIG. 19B are the threaded area (1908) allowing installation of lean-burn PCC in the cylinder head (1911).

Similarly, the lambda distribution in a conventional PCC compared to a lean-burn PCC may be much more heterogeneous with large pockets of rich mixture (2001 and 2002) and large regions of lean mixtures (2003). In contrast, the lean-burn PCC including fuel valve (2004), a combustion ionization sensor (2005), and spark plug (2006) with spark plug gap (2007) may achieve very uniform lambda distributions, with regions moderately rich (2008) and regions moderately lean (2010). FIG. 20B also shows cylinder head (2009).

In certain embodiments portrayed in FIGS. 21A-D, is a structural comparison between the conventional PCC and lean-burn PCC. It can be seen that, unlike the conventional PCC (2102), which includes fuel passage receptacle (2100), spark plug receptacle (2101), prechamber volume (2102) and discharge nozzles (2103/2104), lean-burn PCC has angled nozzles (2110, 2111), a threaded area (2109) and a combustion ionization sensor (2106) located in between the spark plug (2107) with electrode gap (2108) and the fuel admission valve (2105). These embodiments may be fitted with a 22 mm×1.5 or ⅞"-18 thread size (2109), allowing the lean burn PCC to screw into the cylinder head in place of a conventional spark plug.

In certain embodiments, a more detailed comparison of the nozzles is shown in FIGS. 22A-D. It can be seen that, unlike a conventional PCC with nozzles (2201/2202), a lean-burn PCC may have angled nozzles (2203/2204) suitable to achieve the compound vortex flow pattern (1907), with an axial flow (1910) and a vortex ring (1909), which may be necessary for the efficient combustion of lean mixtures in lean-burn PCC.

In certain embodiments as shown in FIGS. 23A-F, a comparison of the flow velocity fields that may be achieved in the spark plug gap is shown. It can be seen that, while the conventional PCC may have very inconsistent flow (2301, 2302, 2304), the lean-burn PCC may have very uniform flow velocity magnitude and direction (2305, 2306, 2307).

In certain embodiments as shown in FIGS. 24A-B, the levels of Turbulent Kinetic Energy (TKE) achieved in the conventional PCC (2401, 2402) compared to those achieved with lean-burn PCC (2408, 2407) are shown. It can be seen that the TKE achieved with lean-burn PCC including fuel valve (2403), a combustion ionization sensor (2404), and spark plug (2405) with spark plug gap (2406) may be much higher due to the interaction between the compound vortex flow patterns (1907), with vortex ring (1909). The higher TKE may result in the higher combustion efficiency. These embodiments may be fitted with a 22 mm×1.5 or ⅞"-18 thread size (2409), allowing the lean burn PCC to screw into the cylinder head in place of a conventional spark plug.

In certain embodiments, the superior performance of a lean-burn PCC compared to the conventional PCC is shown in FIGS. 25A-D in terms of flame jet momentum emerging from the PCC. It can be seen that in the case of the lean-burn PCC including fuel valve (2503), combustion ionization sensor (2504), and spark plug (2505) with spark plug gap (2506), the flame jets (2508, 2509) may be more consistent and much bigger compared to those emerging from the conventional PCC (2501, 2502). These embodiments may be fitted with a 22 mm×1.5 or ⅞"-18 thread size (2507), allowing the lean burn PCC to screw into the cylinder head in place of a conventional spark plug.

In certain embodiments, with the larger and more consistent flame jets a better combustion performance may be achieved. FIG. 26 shows the improved efficiency/emission (ITE/NOx) trade-off, to be in excess of 1 percentage point (from 45% to more than 46%).

In certain embodiments shown in FIGS. 27A-B is a flow velocity comparison at the combustion ionization sensor location. It can be seen that for conventional PCC, FIG. 27A, the flow velocity field may be very unorganized as the velocity vectors have different magnitude and direction (2701, 2702 and 2703). Under these conditions, the signal from a combustion ionization sensor may be very noisy, making the close-loop control on the combustion process very unreliable. On the other hand, with lean-burn PCC, FIG. 27B, the flow velocity field may be very organized as the velocity vectors have similar magnitude and direction (2704, 2705 and 2706). Under these conditions, the signal from the combustion ionization sensor (2705) may be very strong and consistent with a high signal-to-noise ratio, making the close-loop control on the combustion process very reliable.

Concerning the fuel-air mixture distribution in the location of the combustion ionization sensor, in certain embodiments as shown in FIG. 28A the fuel-air mixture distribution for the conventional PCC may be very heterogeneous with regions of very rich mixtures (2801, 2802) and regions of very lean mixtures (2803). This condition may introduce considerable signal noise and may make the close-loop control of the combustion process very unreliable. In contrast, the fuel-air mixture distribution with lean-burn PCC, FIG. 28B, may be very uniform throughout the prechamber (2804, 2805, 2806 and 2807), including at the location of the combustion ionization sensor (2805). Under these conditions, the signal from the combustion ionization sensor (2805) may be strong and consistent and may have a high signal-to-noise ratio, making the close-loop control of the combustion process very reliable.

In certain embodiments, the controlled flow dynamic of a lean-burn PCC may have a remarkable effect on the way the fuel burns. Portrayed in FIGS. 29A-C, is the flame front development in the conventional PCC. It can be seen that the flame development may be quite biased on one side of the PCC (2901, 2902, 2903), resulting in a partial combustion of the PCC volume. Under this condition the emerging flame jets may not be concurrent (2904).

In the case of lean-burn PCC, the flame development may be much more uniform as shown in FIGS. 30A-B. The initial flame front may be centered (3001) resulting from the effect of the compound vortex and further may develop evenly towards the nozzles (3002) accelerated by the high TKE. Consequently, as shown in FIG. 30C, the PCC volume may be entirely combusted (3003) and concurrent flame jets emerge from the nozzles (3004).

Certain embodiments of a lean-burn PCC are shown in FIG. 31. A lean-burn PCC with a nozzle offset (303) and an induction diameter (3103) of predetermined values may generate a rotational flow combined with an axial flow (3102) resulting in a compound vortex flow pattern (3101a-b) having a primary vorticity pattern in a plane orthogonal to the axial direction and a secondary toroidal vorticity, forming a vortex ring pattern (3101b) around the axial direction. The vortex ring (3101b) may have peripheral velocities lower than inner velocities, causing the flame to be drawn into the vortex ring, to become energized and to develop at accelerated rates. The compound vortex flow pattern (3101a-b) may cause any droplet of lube oil engaged in this flow pattern to rapidly vaporize and mix with the surrounding, thereby preventing the autoignition of the liquid droplets. The fuel-air mixture may be uniformly distributed with a richer fuel-air mixture in the spark plug region and a leaner fuel-air mixture towards the nozzles region. The fuel-air mixture distribution of the compound vortex flow pattern (3101a-b) may prevent the ejection from the PCC of unburned fuel ahead of the flame jet/s, thereby avoiding burning rich fuel-air mixture and avoid the formation of high concentrations of NOx and CO. A screw-in PCC with thread arrangement (3108) may allow installation of the screw-in PCC in place of M22×1.5 or ⅞"-18 thread size spark plug. Reduced flow fuel admission valve (3109) may be capable of delivering up to 70% lower fuel flow rates in the PCC to achieve lean fuel-air mixture conditions. PCC geometrical structure may be defined by the following parametric ranges:

a. Nozzle offset (303) may be between about 1 mm and about 10 mm.
 b. Induction or internal diameter (3103) may be between about 5 mm and about 30 mm.
 c. Induction length (3104) may be between 3 and 9 times the internal diameter (3103).
 d. Transition length (3105) may be between 0.25 and 1.75 times the induction length (3104).
 e. Stabilization length (3106) may be between 0.25 and 2.5 times the induction length (3104).

The foregoing geometrical structure ranges may have proportional relationships to the engine cylinder bore diameter, piston speed, combustion chamber flow velocities and charge densities. The foregoing geometrical structure ranges; may create compound vortex flow velocities (3101) up to about 300 m/s; axial velocities up to about 200 m/s; faster flow velocities towards the nozzles (1910) and slower flow velocities at the spark plug (1907); uniform fuel-air mixture distribution up to λ=1.6-1.9 (2007, 2008 and 2010); lambda stratification in the axial direction in the range of λ=0.1-1.0, with richer fuel-air mixture in the spark plug region (2007) and leaner fuel-air mixture towards the nozzles (2010); high TKE in the range of about 100 to greater than about 200 $m^2/s^2$ (2407, 2408) with higher TKE towards the nozzles and lower TKE towards the spark plug. Combustion ionization sensor (3107) may be located in the proximity of the core of the compound vortex flow field where the range of velocities and fuel-air mixture variations may be minimal, allowing the resulting ionization signal to have low noise-to-signal ratio. PCC maximum diameter (3110) to minimum diameter (3103) ratio may be greater than 2. PCC aspect ratio, defined as total length=(3104)+(3105)+(3106) divided by the maximum diameter (3110) may be greater than 2.

The foregoing geometrical structure ranges may create a progressive flame growth (3001) from the rich lambda region to lean lambda region, in the radial and axial directions (3002), which may achieve nearly complete burning (3003) of the fuel-air mixture in the PCC prior to the flame jets exiting the PCC, resulting in powerful and concurrent flame jets.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A lean burn pre-combustion chamber comprising:
   an external surface and an internal surface enclosing a prechamber volume;
   one or more nozzles communicating between the external surface and the internal surface wherein each of the one or more nozzles comprises a nozzle offset between 1 mm and 10 mm;
   an induction zone comprising an induction diameter and an induction length between 3 and 9 times the induction diameter and wherein the nozzle offset and the induction diameter are configured to generate a compound vortex flow pattern in the prechamber volume;
   a transition zone comprising a throat and a transition length between 0.25 and 1.75 times the induction length;
   a stabilization zone comprising a stabilization length between 0.25 and 2.5 times the induction length; and
   a fuel admission valve configured to introduce fuel into the compound vortex flow pattern and to generate a uniform fuel air mixture distribution with lambda between 1.2 and 2.0 by controlling the admitted amount of fuel.

2. The lean burn pre-combustion chamber of claim 1, further comprising a combustion ionization sensor proximate the core of the compound vortex flow.

3. The lean burn pre-combustion chamber of claim 1, further comprising:
   a spark-gap electrode assembly, comprising:
     a primary electrode disposed within the prechamber volume; and
     one or more ground electrodes disposed within the prechamber volume and offset from the primary electrode to form one or more electrode gaps; and
   an attachment mechanism configured to removably attach the lean burn pre-combustion chamber to a cylinder head.

4. The lean burn pre-combustion chamber of claim 3, wherein the attachment mechanism comprises a plurality of external threads configured to removably engage a plurality of internal threads on the cylinder head.

5. The lean burn pre-combustion chamber of claim 3, wherein the attachment mechanism comprises a clamp for clamping the lean burn pre-combustion chamber to the cylinder head.

6. The lean burn pre-combustion chamber of claim 3, wherein the plurality of external threads comprises a 22 mm×1.5 or ⅞"-18 thread size to permit the pre-combustion chamber to be screwed into the cylinder head in place of a spark plug.

7. A method of lean-burn combustion comprising:
   providing a pre-chamber comprising:
     an external surface and an internal surface enclosing a prechamber volume;
     one or more nozzles communicating between the external surface and the internal surface wherein each of the one or more nozzles comprises a nozzle offset between 1 mm and 10 mm;
     an induction zone comprising an induction diameter and an induction length between 3 and 9 times the induction diameter;
     a transition zone comprising a throat and a transition length between 0.25 and 1.75 times the induction length;
     a stabilization zone comprising a stabilization length between 0.25 and 2.5 times the induction length; and
     a spark-gap electrode assembly, comprising:
       a primary electrode disposed within the prechamber volume; and
       one or more ground electrodes disposed within the prechamber volume and offset from the primary electrode to form one or more electrode gaps; and
     a fuel admission valve;
   generating a compound vortex flow pattern in the prechamber volume having a primary vorticity in a plane orthogonal to an axial direction and a second toroidal vorticity forming a vortex ring pattern around the axial direction;
   introducing at least one fuel in-filling stream into the compound vortex flow pattern through the fuel admission valve to generate a uniform fuel air mixture distribution with lambda between 1.2 and 2.0; and
   introducing a spark across at least one of the one or more electrode gaps to ignite the fuel-air mixture.

8. The method of claim 7, wherein the vortex ring comprises peripheral velocities lower than inner velocities causing a flame to be drawn into the vortex ring, to become energized and to develop at accelerated rates.

9. The method of claim 7, further comprising rapidly vaporizing and mixing with surrounding fuel any droplet of lube oil that becomes drawn into the compound vorticity pattern mixture to prevent the autoignition of the droplet of lube oil.

10. The method of claim 7, wherein the compound vorticity pattern comprises a substantially uniformly distributed fuel-air mixture with a relatively leaner lambda in the induction zone and a relatively richer lambda in the stabilization zone.

11. The method of claim 7, wherein the pre-combustion chamber further comprises a combustion ionization sensor proximate the core of the compound vortex flow.

12. The method of claim 7, further comprising progressively growing a flame from a rich lambda region to a lean lambda region in the radial and axial directions to achieve nearly complete burning of the fuel-air mixture in the pre-combustion chamber prior to a plurality of flame jets exiting the pre-combustion chamber.

13. The method of claim 7, further comprising removably attaching the pre-chamber to a cylinder head.

\* \* \* \* \*